United States Patent [19]
Murata et al.

[11] Patent Number: 5,593,016
[45] Date of Patent: Jan. 14, 1997

[54] CLUTCH DEVICE FOR AN AUTOMATIC TRANSMISSION

[75] Inventors: Kiyohito Murata, Susono; Yoshio Shindo, Numazu, both of Japan

[73] Assignee: Toyota Jidosha Kabushiki Kaisha, Toyota, Japan

[21] Appl. No.: 417,765

[22] Filed: Apr. 6, 1995

[30] Foreign Application Priority Data

Apr. 7, 1994 [JP] Japan ..................... 6-069632

[51] Int. Cl.⁶ ............................. F16D 25/063
[52] U.S. Cl. ................... 192/85 AA; 192/52.5; 192/54.3; 192/54.52
[58] Field of Search ................ 192/52.5, 54.3, 192/54.52, 85 AA, 93 A, 70.23, 35; 188/72.2

[56] References Cited

U.S. PATENT DOCUMENTS

| | | | |
|---|---|---|---|
| 2,827,994 | 3/1958 | Tiedemen et al. | 192/93 A |
| 3,199,374 | 8/1965 | O'Malley et al. | |
| 3,674,118 | 7/1972 | Klaue | 192/70.23 X |
| 3,688,882 | 9/1972 | O'Malley | |
| 3,733,920 | 3/1973 | Annis | |
| 5,031,746 | 7/1991 | Koivunen | |
| 5,106,348 | 4/1992 | Koivunen | |
| 5,464,084 | 11/1995 | Aoki et al. | 192/93 A X |

FOREIGN PATENT DOCUMENTS

| | | | |
|---|---|---|---|
| 2-66328 | 3/1990 | Japan | 192/70.23 |
| 2-69134 | 5/1990 | Japan | |
| 1149573 | 4/1969 | United Kingdom | |
| 2251465 | 7/1992 | United Kingdom | 192/70.23 |

OTHER PUBLICATIONS

1992 Toyota Repair Manual Automatic Transaxle, Jul. 10, 1991, A 540E Overseas Service Division, Toyota Motor Corporation, pp. AX2–AX6.

The Multi–Mode Clutch—A New Technology For Freewheeler Shifting Automatic Transmissions, Erkki Koivunen, et al., SAE 930911, pp. 181–194.

1991 Toyota Repair Manual Automatic Tansaxle, Aug. 15, 1990, The A140L and A140E Overseas Service Division, Toyota Motor Corporation, pp. AT2–AT7.

Toyota Corona FF Coupe, Aug. 1985.

*Primary Examiner*—Rodney H. Bonck
*Attorney, Agent, or Firm*—Oblon, Spivak, McClelland, Maier & Neustadt, P.C.

[57] ABSTRACT

A clutch device which can perform the plural functions required in an automatic transmission is provided. As a result, it is possible to reduce the number of clutch devices required to obtain the desired gear ratios and shift operations. The clutch device, according to the present invention, comprises a pair of members spaced on a common axis and relatively rotating around the common axis, a variable length coupling member disposed on the common axis between the relatively rotating members and having a pair of cam members, and a piston member selectively pushing the variable length coupling member toward one of the relatively rotating members. The piston member causes frictional engagement between one end of the variable length coupling member and one of the relatively rotating members so that the cam members relatively rotate and cooperatingly generate a cam force, in an axial direction, which elongates the variable length coupling member and couples the relatively rotating members. The piston member pushes the variable length coupling member even when the direction of the relative rotation of the relatively rotating members is reversed.

20 Claims, 23 Drawing Sheets

Fig.2

| RANGE | GEAR | $C_1$ | $C_2$ | $C_3$ | $B_1$ | $B_2$ | $B_3$ | $B_4$ | $F_1$ | $F_2$ | $F_3$ |
|---|---|---|---|---|---|---|---|---|---|---|---|
| P (PARKING) | | | | ON | | | | | | | |
| R (REVERSE) | | | ON | ON | | | ON | | | | |
| N (NEUTRAL) | | | | ON | | | | | | | |
| D | O/D | ON | ON | | | ON | | ON | | | |
| D | THIRD | ON | ON | ON | | ON | | | | | ON |
| D | SECOND | ON | | ON | | ON | | | | ON | ON |
| D | FIRST | ON | | ON | | | | | | ON | ON |
| 2 | SECOND | ON | | ON | ON | ON | | | | ON | ON |
| 2 | FIRST | ON | | ON | | | | | | ON | ON |
| L | FIRST | ON | | ON | | | ON | | | ON | ON |

CLUTCH DEVICE FOR AN AUTOMATIC TRANSMISSION

BACKGROUND OF THE INVENTION

1. Field of the Invention

The present invention relates to a clutch device used in an automatic transmission for an automobile.

2. Description of the Related Art

In an automatic transmission used in an automobile, plural planetary gearsets are used. In this type of automatic transmission, plural clutch devices are used to perform gear shifting by changing the connections between the elements of the planetary gearsets.

To change from one gear ratio to the next gear ratio, for example, operations to rotate elements which were stationary before the shift, or to lock elements which were rotating before the shift, or to reverse the direction of the rotation of an element are required.

Therefore, a one-way clutch has been used to synchronize the engaging time of one clutch device with the disengaging time of another clutch device to carry out smooth shifting from the first gear to the second gear, a brake for locking the free-running function of the one-way clutch to attain engine braking in the first gear, another one-way clutch to synchronize the engaging time of one clutch device and the disengaging time of another clutch device to carry out smooth shifting from the second gear to the third gear, and another brake for locking the free running function of the latter one-way clutch to attain engine braking in the second gear (New Car Features of domestic TOYOTA CORONA FF Coupe, 4 Door Sedan, 5 Door, August 1985).

Thus, one-way clutches are required only for synchronizing the engaging time of one clutch device with the disengaging time of another clutch device, and it caused an increase of axial length, weight and cost.

SUMMARY OF THE INVENTION

Therefore, an object of the present invention is to provide a clutch device which does not require one-way clutches for synchronizing engaging and disengaging times, or brakes to lock the free-running functions of these one-way clutches.

According to the present invention there is provided a clutch device, which comprises; a pair of members spaced on a common axis and relatively rotating around the common axis, a variable length coupling means, disposed on the common axis between the relatively rotating members, having a pair of cam members, and a piston means selectively pushing the variable length coupling means toward one of the relatively rotating members. The piston means cause frictional engagement between one end of the variable length coupling means and one of the relatively rotating members so that the cam members relatively rotate and cooperatingly generate a cam force in an axial direction which elongates the variable length coupling means and connects the relatively rotating member and the piston means pushes the variable length coupling means even when the direction of the relative rotation of the relatively rotating members is reversed.

The present invention will be more fully understood from the description of preferred embodiments of the invention set forth below, together with the accompanying drawings.

BRIEF DESCRIPTION OF THE DRAWINGS

In the drawings:

FIG. 2 shows the combination of the clutch devices to be engaged at each range and gear ratio of the transmission of FIG. 1;

DESCRIPTION OF THE PREFERRED EMBODIMENTS

Figure 1:
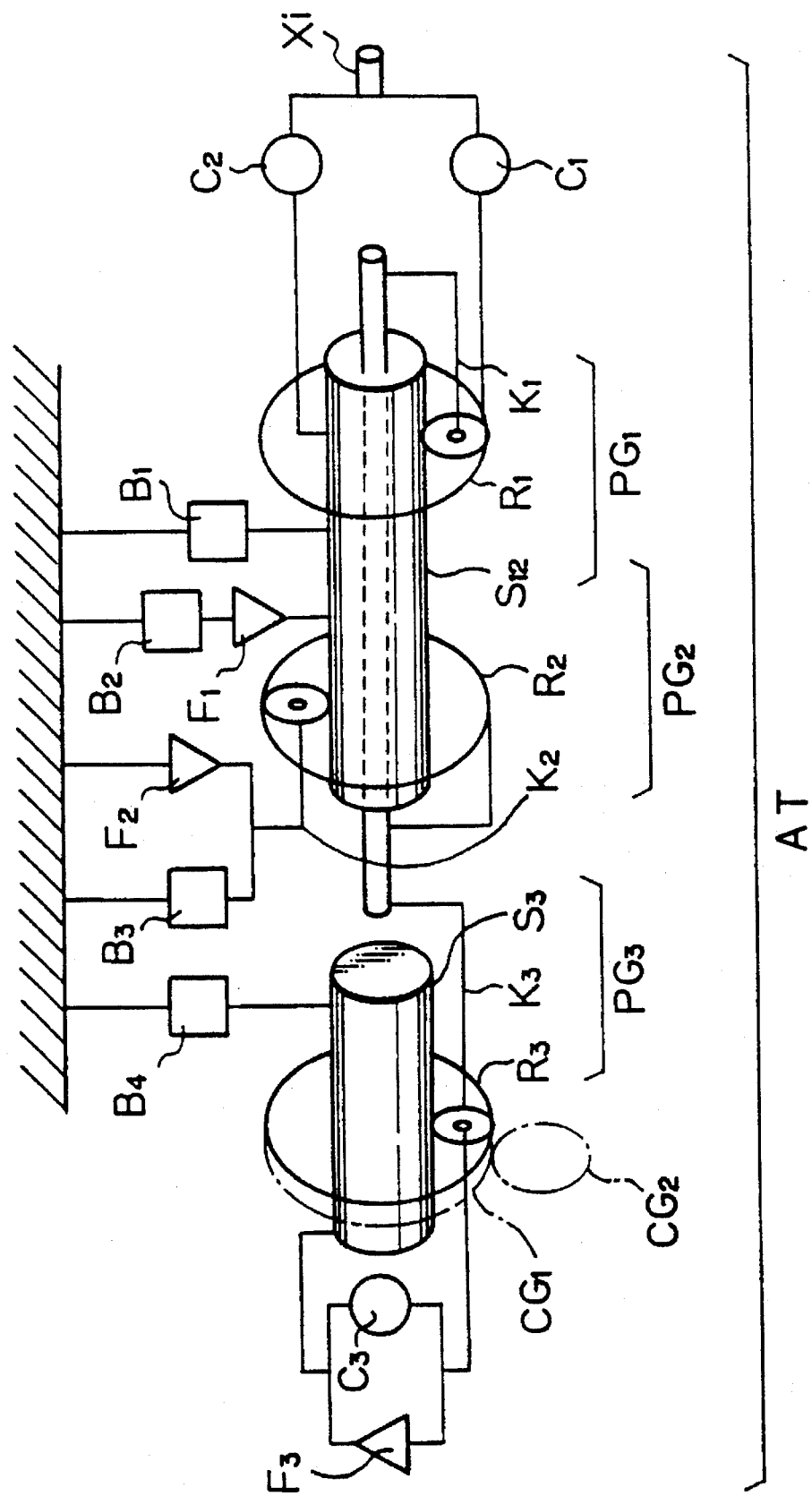
FIG. 1 is a schematic diagram of the automatic transmission having four forward speeds and one reverse speed.

In FIG. 1, AT generally represents an automatic transmission, and comprises three sets of planetary gear units, plural frictional engagement devices to change operating conditions of the ring gears, and sun gears and carriers which compose the planetary gear units.

$X_i$ represents an input shaft and is connected with an output shaft of a torque converter (not shown).

$PG_1$, $PG_2$ and $PG_3$ represent a front planetary gear unit, a rear planetary gear unit and an O/D planetary gear unit respectively.

$R_1$, $R_2$ and $R_3$ each represent a front planetary ring gear, a rear planetary ring gear and an O/D planetary ring gear respectively.

$K_1$, $K_2$ and $K_3$ each represent a front planetary carrier, a rear planetary carrier and an O/D planetary carrier respectively.

$S_{12}$ represents a front and rear planetary sun gear and $S_3$ represents an O/D planetary sun gear.

$C_1$ represents a first clutch which engages the input shaft $X_i$ with the front planetary ring gear $R_1$.

$C_2$ represents a second clutch which engages the input shaft $X_i$ with the front and rear planetary sun gear $S_{12}$.

$C_3$ represents a third clutch which engages the O/D planetary carrier $K_3$ and the O/D planetary sun gear $S_3$.

$B_1$ represents a first brake which locks the clockwise and counterclockwise revolution of the front and rear planetary sun gear $S_{12}$.

$B_2$ represents a second brake which locks the counterclockwise revolution of the front and rear planetary sun gear $S_{12}$.

$B_3$ represents a third brake which locks the clockwise and counterclockwise revolution of the rear planetary carrier $K_3$.

$B_4$ represents a fourth brake, which locks the clockwise and counterclockwise revolution of the rear planetary carrier $K_3$.

$F_1$ represents a first one-way clutch which locks the counterclockwise revolution of the front and rear planetary sun gear $S_{12}$.

$F_2$ represents a second one-way clutch which locks the counterclockwise revolution of the front and rear planetary sun gear $S_{12}$.

$F_3$ represents a third one-way clutch which locks the counterclockwise revolution of the O/D planetary carrier in relation to O/D sun gear $S_3$.

$CG_1$ and $CG_2$ respectively represents a counter drive gear and a counter driven gear for transmitting the engine torque, with a changed rotation speed, to a drive pinion which is an output shaft of the automatic transmission.

FIG. 2 shows the combination of the clutch devices to be engaged at each range and gear speed. As shown in FIG. 2, for example, to attain the first gear speed in the L range, the first clutch $C_1$, the third clutch $C_3$, the third brake $B_3$, the second one-way clutch $F_2$ and the third one-way clutch $F_3$ should be engaged.

Figure 3:
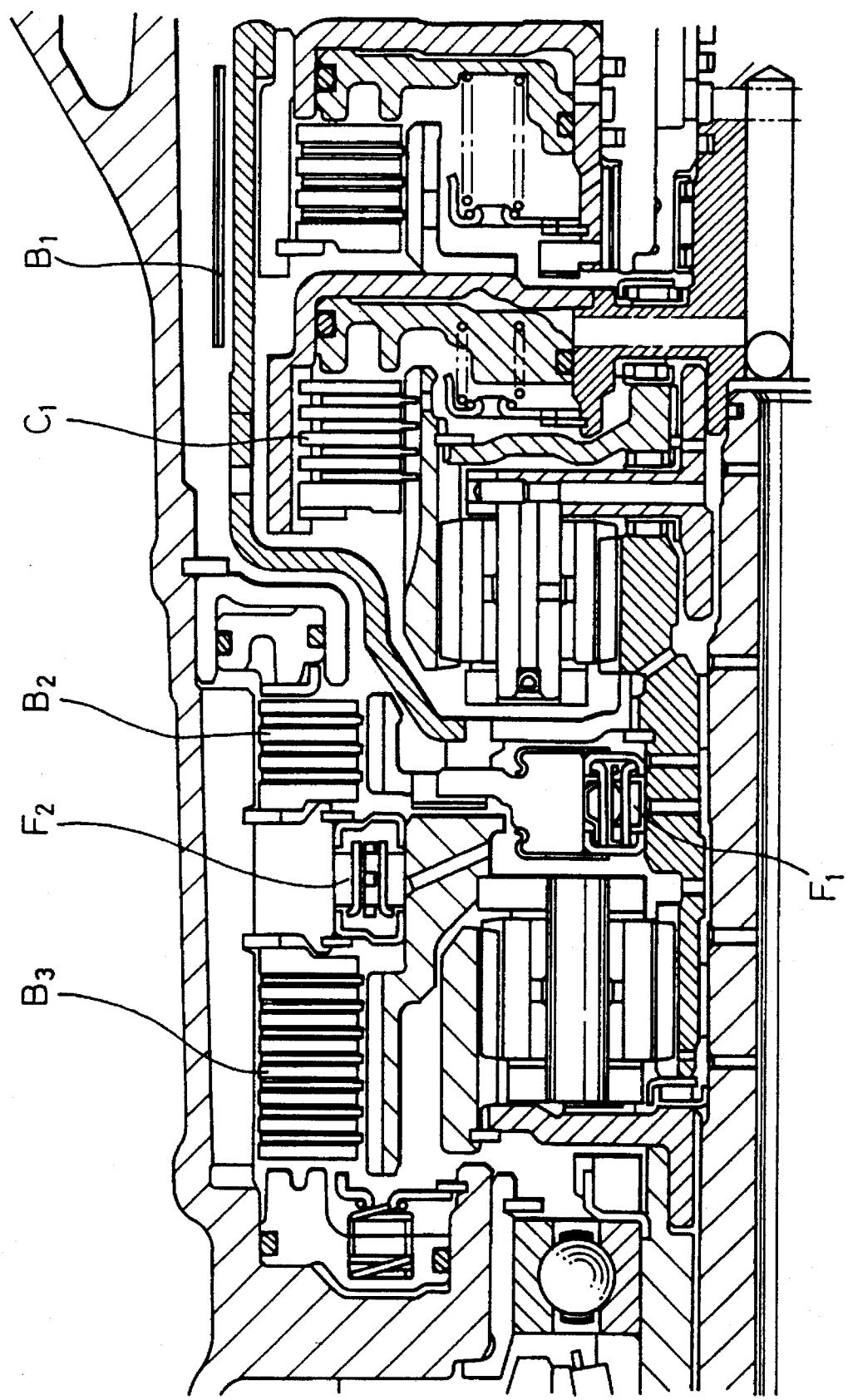
FIG. 3 is a sectional view of the transmission of FIG. 1 with a conventional structure.

FIG. 3 is a sectional view of an automatic transmission with a conventional structure in which embodiments of the present invention, the details of which are described below, are applied.

Figure 4:
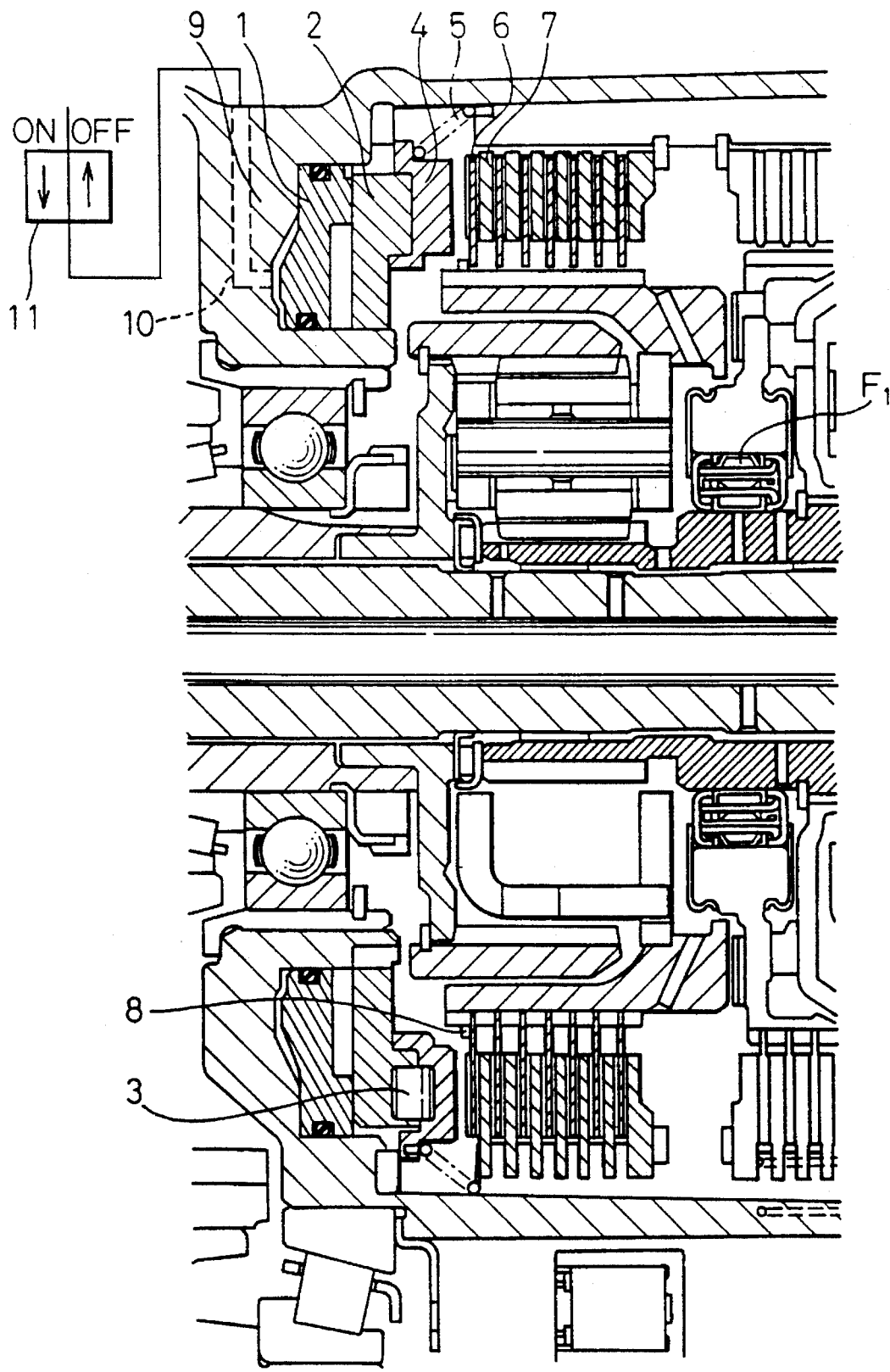
FIG. 4 is a sectional view of the first embodiment applied in place of the third brake $B_3$ and the second one-way clutch $F_2$ of the conventional type transmission shown in FIG. 3.

FIG. 4 shows the first embodiment of the present invention which is applied to provide functions which are performed by the third brake $B_3$ and the second one-way clutch $F_2$ in case of the conventional type automatic transmission shown in FIG. 3.

By a construction and the operations described below, the second one-way clutch $F_2$ is not used.

In FIG. 4, reference numeral 1 represents a piston. A first cam member 2, a cam roller 3 and a second cam member 4 form a cam mechanism. A spring 5 always pushes the first cam member 2 and the second cam member 4, including the cam roller 3, to the left in the figure.

The clutch discs 6, which are connected to the rear planetary carrier $K_2$, and the separator plates 7, which are connected to the outer casing of the automatic transmission AT, are selectively engaged with each other. A snap ring 8 limits the movement of the clutch discs 6 to the left, to prevent the clutch discs 6 from contacting with the second cam member 4 and interfere with the operation of the cam member 4. A clutch casing 9 has a recess in which piston 1 moves, and has an oil passage 10 to supply oil under pressure to the piston 1. An oil pressure control valve 11 controls the supply of oil under pressure to the piston 1.

Figure 6:
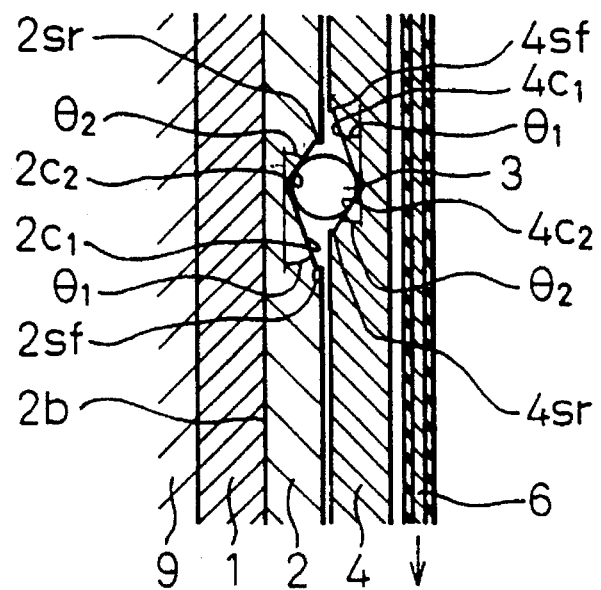
FIG. 6 is a partial sectional view taken along the line A—A of FIG. 5.

Cam faces $2c_1$ and $2c_2$ and cam faces $4c_1$ and $4c_2$ are formed on the opposing surfaces of the first cam member 2 and the second cam member 4, as shown in FIG. 6.

Cam angle $\theta_1$ of the cam faces $2c_1$ and $4c_1$, and cam angle $\theta_2$ of the cam faces $2c_2$ and $4c_2$ is, respectively defined so as to satisfy $\tan \theta_1 < \mu$, and $\tan \theta_2 > \mu$, where $\mu$ means the coefficient of friction between the second cam member 4 and the clutch disc 6.

Roller stoppers 2sf and 4sf, shown in FIG. 6, cooperatingly prevent the cam roller 3 from coming off the cam located part of the first cam member 2 and the second cam member 4 when the clutch disc 6 rotates counterclockwise.

Roller stoppers 2sr and 4sr, shown in FIG. 6, cooperatingly prevent the cam roller 3 from coming off the cam located part of the first cam member 2 and the second cam member 4 when the clutch disc 6 rotates clockwise.

Figure 5:
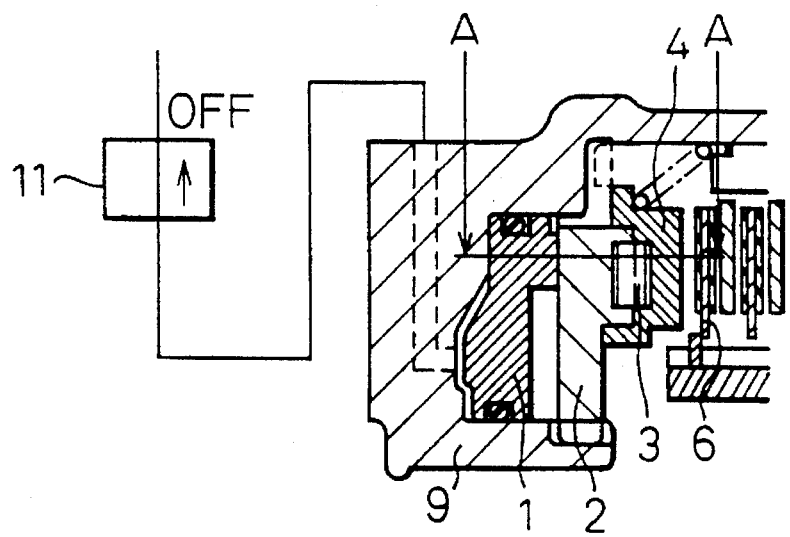
FIG. 5 is a partial sectional view of the first embodiment, at disengaged condition with no oil pressure supplied to the piston.

FIGS. 5 and 6 show a condition with no oil pressure supplied and the first cam member 2 and the second cam member 4, including cam roller 3, are forced to the left end position by spring 5, so that the second cam member 4 and clutch disc 6 are separated. Thus the rear planetary carrier $K_2$, which is connected to the clutch discs 6, is not locked regardless of the direction of the rotation.

Figure 7:
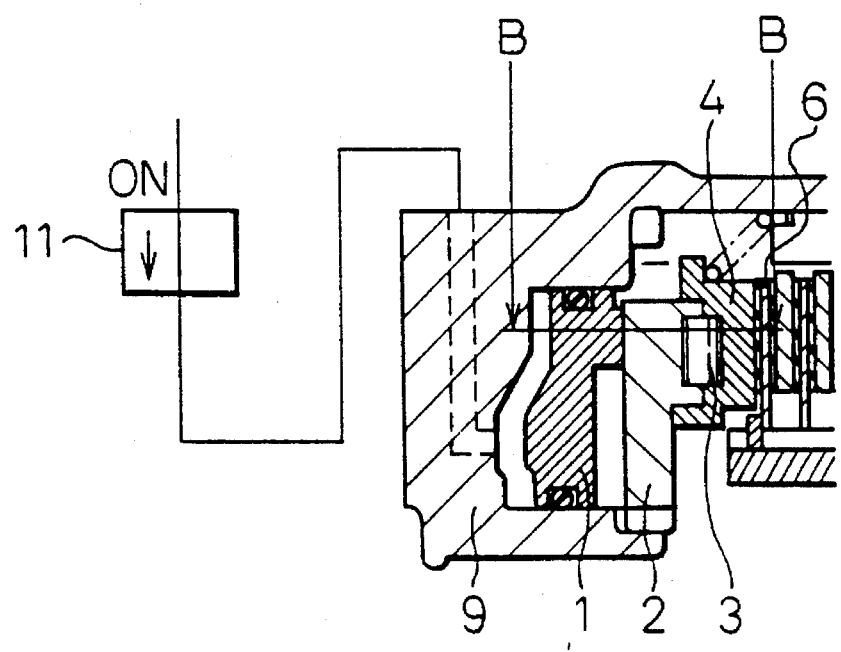
FIG. 7 is a partial sectional view of the first embodiment, at a condition with piston pushing cam members fully to the right.
Figure 8:
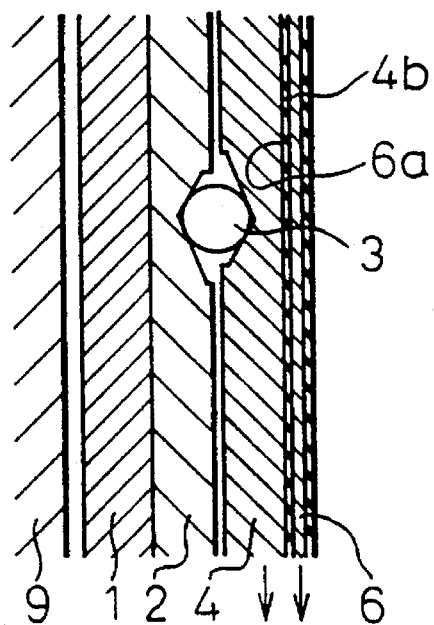
FIG. 8 is a partial sectional view taken along the line B—B of FIG. 7.

FIGS. 7 and 8 show a condition when oil under pressure is supplied to the back surface of the piston 1 during the counterclockwise rotation of the clutch disc 6.

When oil under pressure is supplied to the back surface of the piston 1, the first cam member 2 and the second cam member 4, including the cam roller 3, are pushed to the right by the piston 1, so that, in due course, the back surface 4b of the second cam member 4 and a friction surface 6a of the clutch disc 6 engage with each other, as shown in FIGS. 7 and 8. Then, the second cam member 4 is dragged by the clutch disc 6 and begins to rotate in the same direction as the clutch disc 6.

Figure 9:
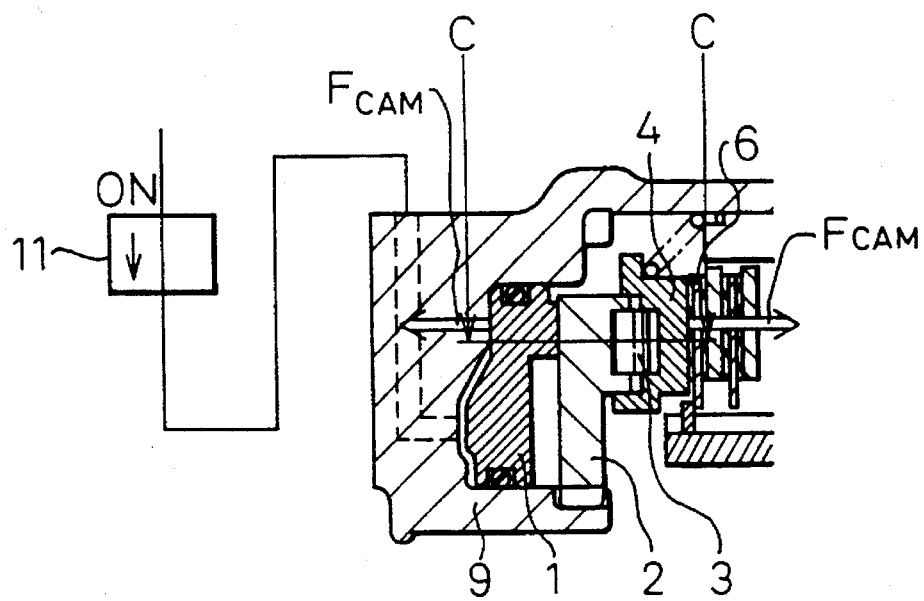
FIG. 9 is a partial sectional view of the first embodiment, in an engaged condition with cam members generating reaction force.
Figure 10:
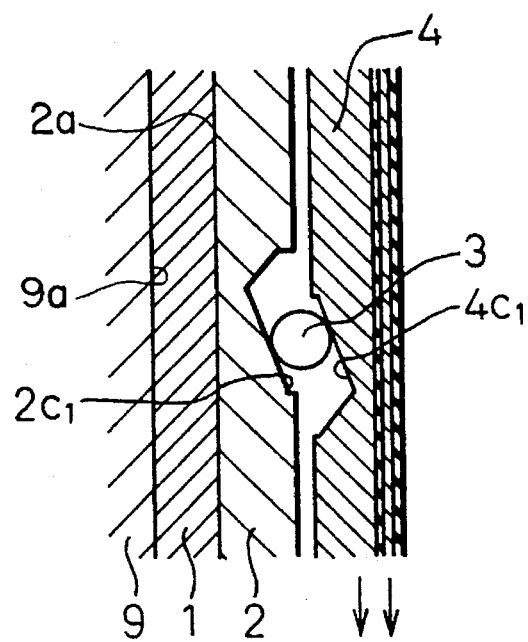
FIG. 10 is a partial sectional view taken along the line C—C of FIG. 9.

In due course, as shown in FIGS. 9 and 10, the cam face $4c_1$ of the second cam member 4 begins to climb the cam face $2c_1$ of the second cam member 2 through the cam roller 3, so that a cam reaction force $F_{CAM}$, which tends to push the first cam member 2 to the left and push the second cam member 4 to the right, is generated. Therefore, the piston 1 and the first cam member 3 is pushed to the left by a force $F=F_{CAM}-S \times P$, where S is a square measure of the action area of the piston 1.

Then, the back surface 2a of the first cam member 2 contacts the cam receiving surface 9a of the clutch housing 9, so that the first cam member 2 stops to move. Therefore, a cam reaction force $F_{CAM}$ generated by the further revolution of the second cam member 4 only acts to push the second cam member 4 to the right, so that the engagement force between the clutch disc 6 and the separator plate 7 becomes stronger. As a result, the clutch discs 6 and the separator plates 7 are completely engaged.

Thus the engagement of the clutch discs 6 and the separator plates 7 is performed by the cam reaction force $F_{CAM}$ which is proportional to the input torque.

If the oil pressure control valve 11 is switched to relieve the oil pressure after completion of the engagement, the force F becomes equal to a cam reaction $F_{CAM}$ and the clutch discs 6 and the separator plates 7 can be disengaged when the clutch disc 6 reverses the direction of the rotation from counterclockwise to clockwise, as described below.

When the clutch disc 6 rotates clockwise, the second cam member 4 also begins to rotate clockwise by being dragged by the clutch disc 6. In due course, the cam face $4c_1$ descends the cam face $2c_1$ through the cam roller 3 therefore the cam reaction force generated by the cam mechanism disappears, and then the first cam member 2 and the second cam member 4, including the cam roller 3, is pushed to the left by the biasing force of the spring 5. Therefore, the clutch discs 6 and the separator plates 7 are disengaged.

Figure 11:
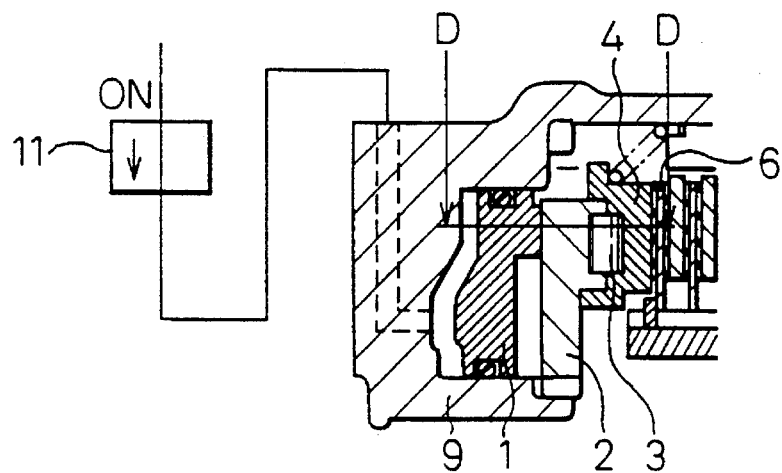
FIG. 11 is a partial sectional view of the first embodiment, in an engaged condition with a reversed torque input.
Figure 12:
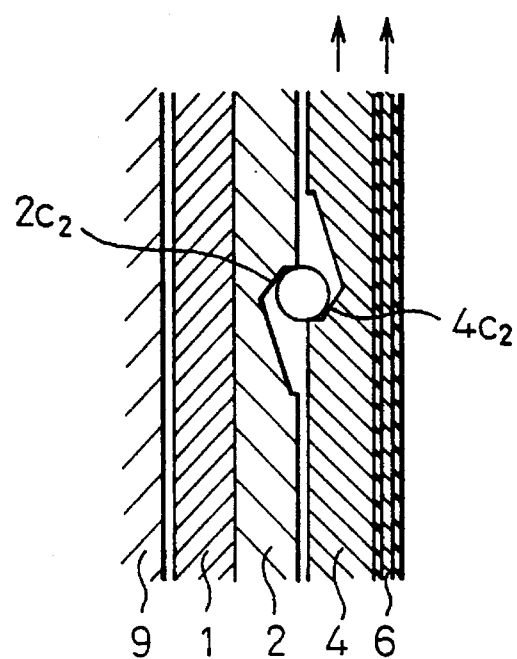
FIG. 12 is a partial sectional view taken along the line D—D of FIG. 11.

FIGS. 11 and 12 show the condition when the clutch disc 6 reverses the direction of the rotation from counterclockwise to clockwise while the oil pressure supply is maintained.

When the clutch disc 6 rotates clockwise, as described above, the second cam member 4 also begins to rotate clockwise by being dragged by the clutch disc 6. In due course, the cam face $4c_2$ descends the cam face $2c_1$ through the cam roller 3 and stops when the cam roller 3 reaches the roller stopper 2sr of the first cam member 2 and the roller stopper 4sr of the second cam member 4, as shown in FIG. 12.

By maintaining the oil pressure supply, the second cam member 4 is pushed to the right, so that the clutch discs 6 and the separator plates 7 can be kept in engaged condition. Therefore, the clockwise rotation of the rear planetary carrier $K_2$ can be locked.

If the oil pressure control valve 11 is switched to relieve the oil pressure and reverse the direction of the rotation to counterclockwise, then the clutch discs 6 and the separator plates 7 are disengaged.

The first embodiment of the present invention operates as described above, therefore the clutch discs 6, and accordingly the rear planetary carrier $K_2$ which is splined thereon, are changed to the required operating condition.

The operation locking the counterclockwise rotation of the rear planetary carrier $K_2$, which is performed by locking function of the one-way clutch $F_2$ in the conventional type automatic transmission shown in FIG. 3, is performed under the conditions shown in FIGS. 9 and 10 in this first embodiment.

The operation leaving free the clockwise rotation of the rear planetary carrier $K_2$, which is performed by a free running function of the one-way clutch $F_2$ in the conventional type automatic transmission shown in FIG. 3, is performed at the condition shown in FIGS. 5 and 6 this first embodiment.

The operation locking the clockwise rotation of the rear planetary carrier $K_2$, which is performed by a braking function of the third brake $B_3$ in the conventional type automatic transmission shown in FIG. 3, is performed under the conditions shown in FIGS. 9 and 10 in this first embodiment.

The operation of instantaneously releasing the lock on the counterclockwise rotation of the rear planetary carrier $K_2$ required for the smooth shifting from the first gear speed to the second gear speed in D range, which is performed by the one-way function of the one-way clutch $F_2$ in the conventional type automatic transmission shown in FIG. 3, is performed by automatically releasing the cam functioning by giving a clockwise rotation to the rear planetary carrier $K_2$.

Thus, according to the first embodiment of the present invention one device performs two kinds of functions which are performed by the third brake $B_3$ and the second one-way clutch $F_2$ in the conventional type automatic transmission shown in FIG. 3, and this allows the one-way clutch to be removed and accordingly decreases the axial length and the weight of the transmission.

Figure 13:
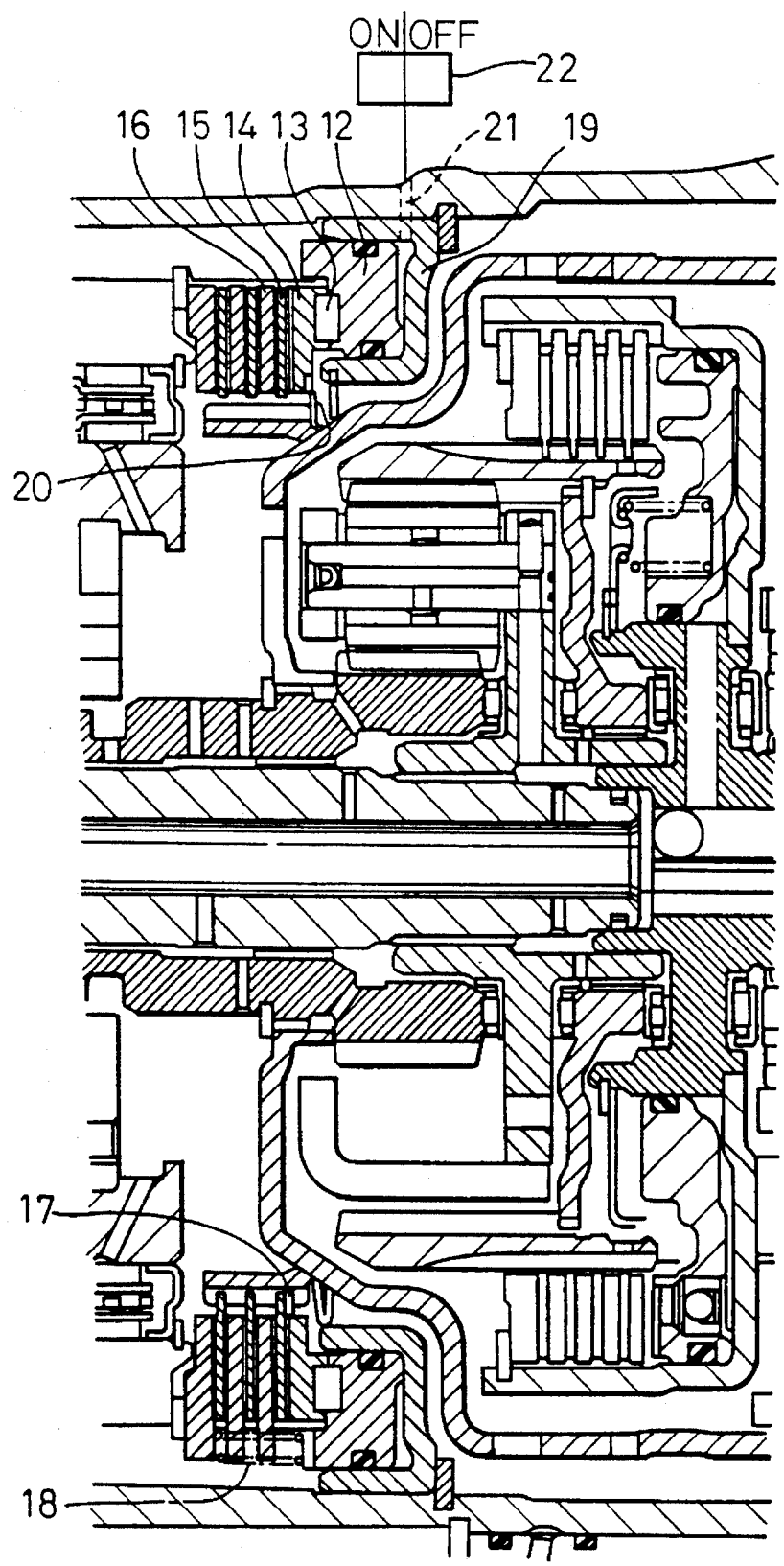
FIG. 13 is a partial sectional view of the second embodiment applied in place of the second brake $B_2$ and the first one-way clutch $F_1$ of the conventional type transmission shown in FIG. 3.

FIG. 13 shows the second embodiment of the present invention which is applied to provide functions which performed by the first brake $B_1$, the second brake $B_2$ and the first one-way clutch $F_1$ in case of the conventional type automatic transmission shown in FIG. 3.

By the construction and operations described below, the first brake $B_1$ and the first one-way clutch $F_1$ are removed, as a consequence.

In FIG. 13, a piston with a first cam member 12, cam roller 13 and a second cam member 14 form a cam mechanism. The piston with a first cam member 12 selectively pushes a second cam member 14, including a cam roller 13 located between the piston with first cam member 12 and the second cam member 14. Clutch discs which are splined to the front & rear sun gear $S_{12}$ are selectively and frictionally engaged with separator plates 16 which are connected to the outer casing of automatic transmission AT.

A snap ring 17 limits the movement of the clutch 1 discs 15 to the right, and prevents the clutch discs from contacting with the second cam member 14 and interfering with the operation of the second cam member 14. A spring 18 always pushes the piston with first cam member 12 to the right. A spring 20 always urges the second cam member 14 to the right. A clutch casing 19 has a recess in which the piston with first member 12 moves, and has an oil passage 21 to supply under pressure to the piston with first cam member 12. An oil pressure control valve 22 controls the supply oil under pressure to the piston with first cam member 12.

Figure 15:
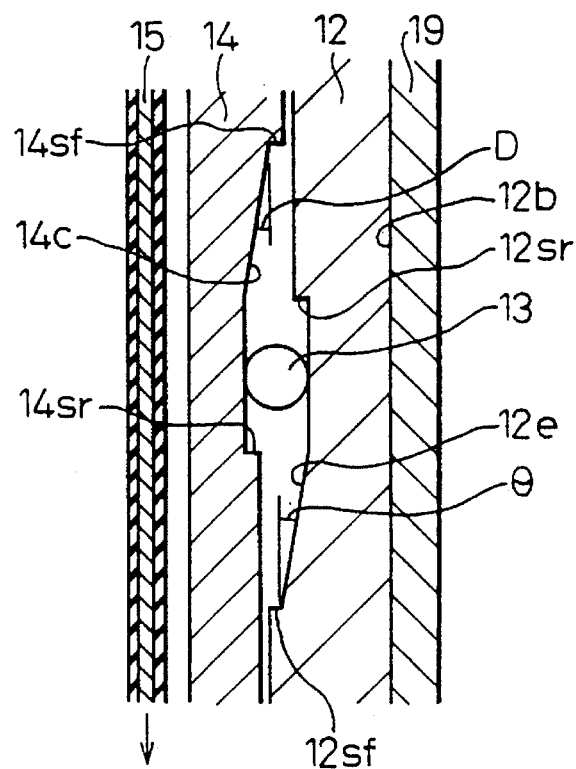
FIG. 15 is a partial sectional view taken along the line E—E of FIG. 14.

Cam faces 12c and 14c are formed on the opposing surfaces of the piston with first cam member 12 and the second cam member 14, as shown in FIG. 15.

The cam angle θ is defined so as to satisfy tan θ<μ, where μ means the coefficient of friction between the second cam member 14 and the clutch disc 15.

Roller stoppers 12sf and 14sf, shown in FIG. 15, cooperatingly prevent the cam roller 13 from coming off the cam disposed part of the piston with first cam member 12 and the second cam member 14 when the clutch disc 6 rotates counterclockwise.

Roller stoppers 12sr and 14sr, shown in FIG. 15, cooperatingly prevent the cam roller 13 from coming off the cam disposed part of the piston with first cam member 12 and the second cam member 14 when the clutch disc 16 rotates clockwise.

Figure 14:
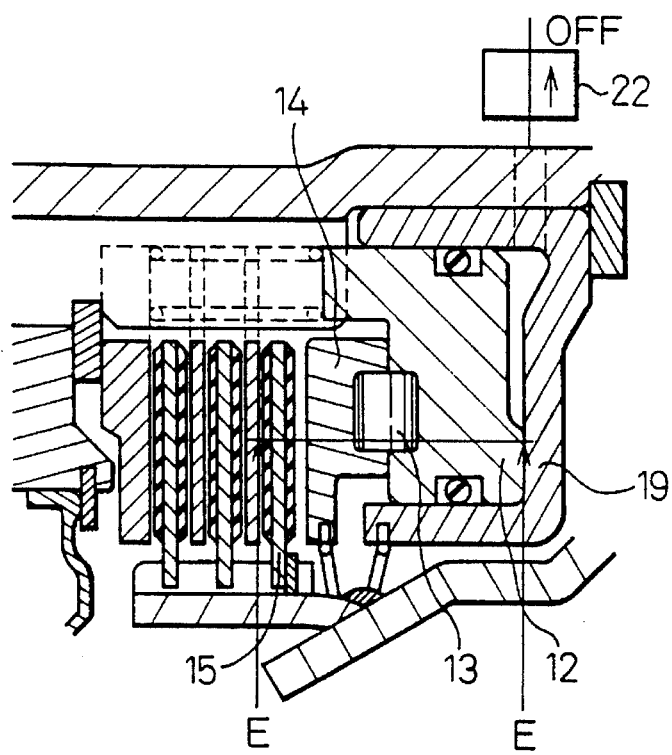
FIG. 14 is a partial sectional view of the second embodiment, at disengaged condition with supplying no oil pressure supplied to the piston.

FIGS. 14 and 15 show a condition when no oil pressure is supplied and the piston with the first cam member 12 is pushed to the right end position by spring 18, so that the back surface 12b of the piston with the first cam member 12 contacts to a wall of the clutch casing 19, and the second cam member 14, including cam roller 13, is forced to the right end position by spring 20, so that the second cam member 14 and clutch disc 15 are separated. Therefore the front and rear sun gear $S_{12}$ which is connected to the clutch discs 6 is not locked regardless of the direction of the rotation.

Figure 16:
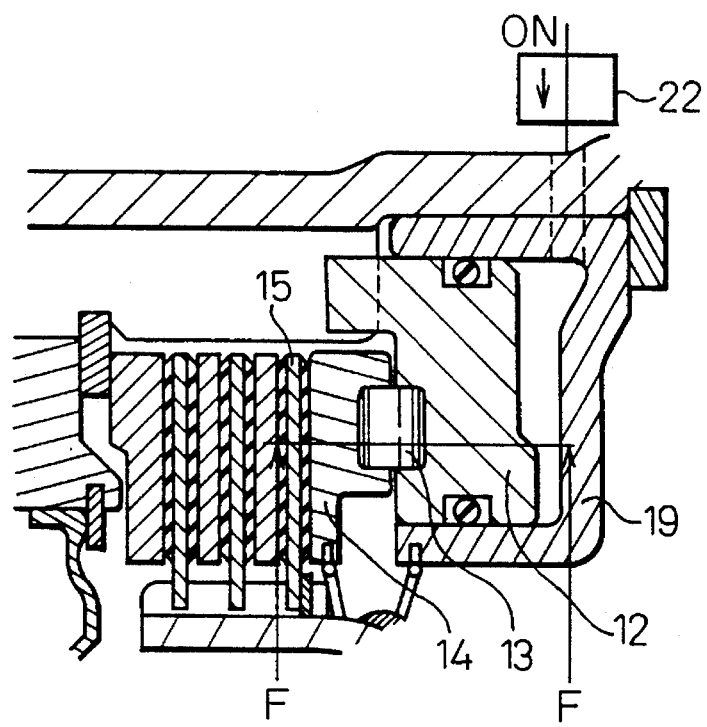
FIG. 16 is a partial sectional view of the second embodiment, in a condition with the piston pushing the cam members fully to the left.
Figure 17:
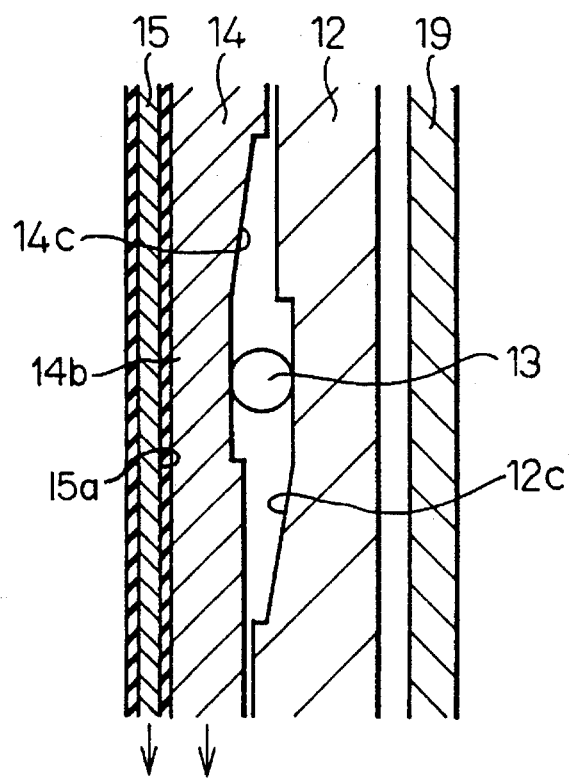
FIG. 17 is a partial sectional view taken along the line F—F of FIG. 16.

When oil under pressure is supplied to the back surface of the piston with first cam member 12, the piston with first cam member 12 and the second cam member 14 are, with the cam roller 13, pushed to the left, so that in due course the back side 14b of the second cam member 14 and a frictional surface 15a of the clutch disc 15 begin to engage with each other as shown in FIGS. 16 and 17. Then, the second cam member 14 is dragged by the clutch disc 15 and begins to rotate in the same direction as the clutch disc 15.

Figure 18:
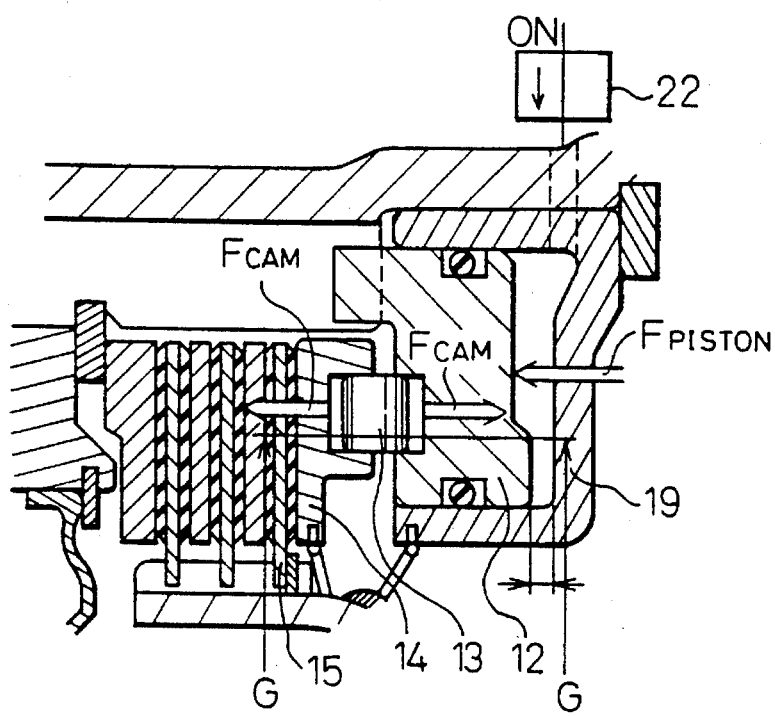
FIG. 18 is a partial sectional view of the second embodiment, in an engaged condition with the cam members being separated and generating reaction force.
Figure 19:
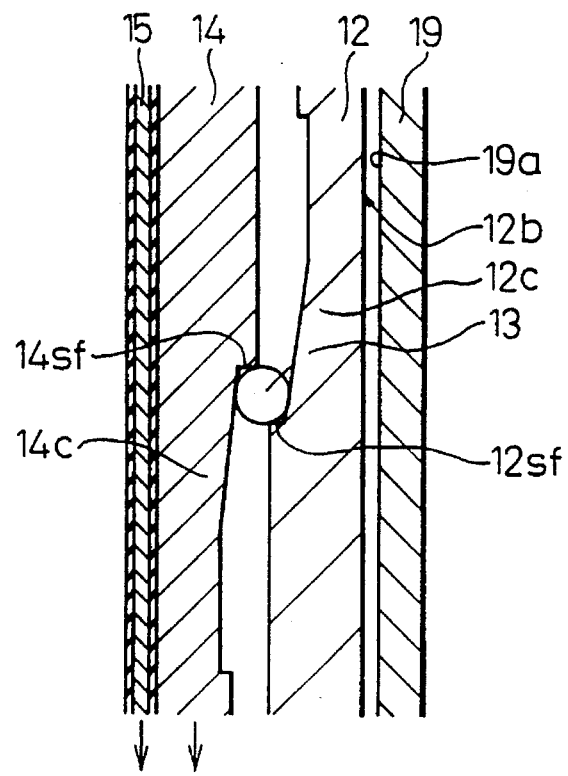
FIG. 19 is a partial sectional view taken along the ling G—G of FIG. 18.

In due course, as shown in FIGS. 18 and 19, the cam face 14c of the second cam member 14 begins to climb the cam face 12c of the piston with first cam member 12 through cam roller 13, so that a cam reaction force $F_{CAM}$, which intends to push the piston with first cam member 12 to right, and push the second cam member 14 to the left is generated.

Therefore, the piston with first cam member 12 and the first cam member 3 is pushed to the right by the cam reaction force $F_{CAM}$ and stops when the cam roller 13 reaches the roller stopper 12sf of the piston with first cam member 12 and the roller stopper 14sf of the second piston 14.

In the above condition, a clearance is kept between the back surface of the piston with first cam member 12 and the piston receiving surface 19a of the clutch casing 19, so that the cam reaction force of the $F_{CAM}$ is received by a pushing force $F_{PISTON}$ which is generated by oil under pressure acting on the piston with first cam member 12. Herein, the force $F_{PISTON}$=S×P, where S is the area of the action area of piston with first cam member 12 and P is the oil pressure. Therefore, the cam reaction force $F_{CAM}$ is limited by the force $F_{PISTON}$ and accordingly, the engaging force is controlled by the oil pressure.

As a result, the clutch disc 15 and the separator plate 16 are engaged and accordingly the clockwise rotation of the front and rear sun gear $S_{12}$ is locked.

If the oil pressure control valve 22 is switched to relieve the oil pressure at the above described condition, then the piston with first cam member 12 and the second cam member 14 are pushed to the left end positions by the spring 18 and 20 respectively, and the clutch discs 15 and separator plates 16 can be disengaged.

Figure 20:
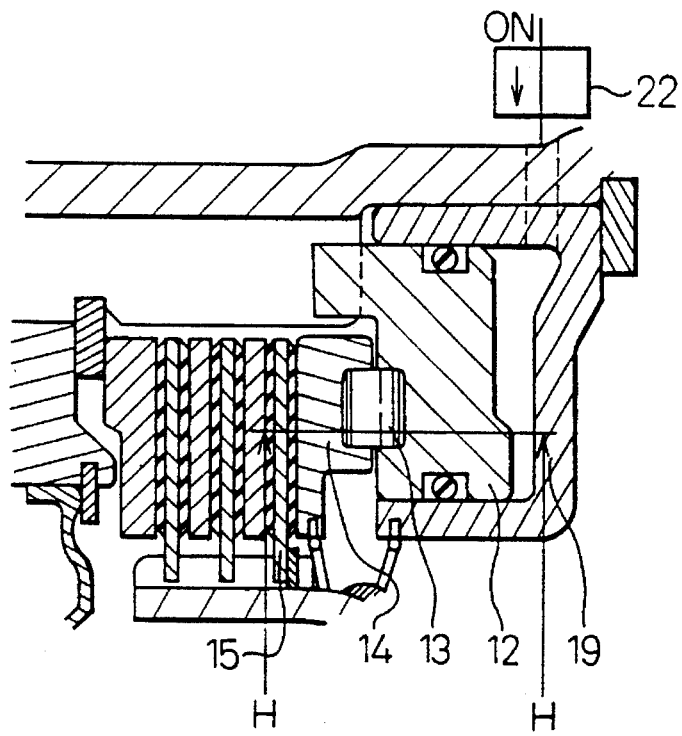
FIG. 20 is a partial sectional view of the second embodiment, in an engaged condition with a reversed torque input.
Figure 21:
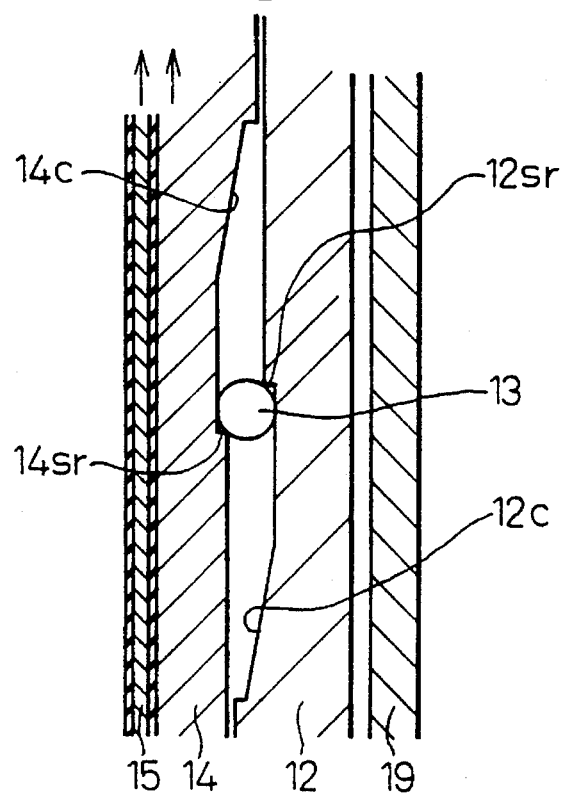
FIG. 21 is a partial sectional view taken along the line H—H of FIG. 20.

When the clutch discs 15 reverse the direction of rotation from counterclockwise to clockwise while keeping the oil pressure supply, the second cam member 14 also begins to rotate clockwise by being dragged by the clutch discs 15. In due course, the cam face 14c of the second cam member descends the cam face 12c of the piston with first cam member 12 through the cam roller 13 and stops when the cam roller 13 reaches the roller stoppers 12sr of the piston with first cam member and 14sr of the second cam member as shown in FIGS. 20 and 21, and the force $F_{CAM}$ generated by the cam mechanism disappears.

However, by maintaining the oil pressure supply, the clutch discs 15 are kept locked, because the back surface 14b of the second cam member 14 and the friction surface of the clutch disc 15 is kept engaged by the force of $F_{PISTON}$. Therefore, the clockwise rotation of the front and rear sun gear $S_{12}$ is locked.

On the other hand, if the oil pressure supply is stopped or relieved so as to make the force of $F_{PISTON}$ zero after the rotation is reversed, then the piston with first cam member 12 is moved to the right end position by the spring 18 and the second cam member 14 is moved to the right end position by the spring 20 and the second cam member 14 and the clutch disc 15 are disengaged.

The second embodiment of the present invention operates as described above, therefore the clutch discs 15, and accordingly the front and rear sun gear $S_{12}$ which is splined thereon, are changed to the required operating condition.

The operation to lock the counterclockwise rotation of the front & rear sun gear $S_{12}$, which is performed by a locking function of the one-way clutch $F_1$ cooperating with the second brake $B_2$ in the conventional type automatic transmission shown in FIG. 3, is performed under the operating condition shown in FIGS. 18 and 19 in this second embodiment of the present invention.

The operation freeing the clockwise rotation of the front and rear sun gear $S_{12}$, which is performed by a free-running function of the one-way clutch $F_1$ in the conventional type automatic transmission shown in FIG. 3, is performed under the operating condition shown in FIGS. 14 and 15 in this second embodiment of the present invention.

The operation locking the clockwise rotation of the front and rear sun gear $S_{12}$, which is performed by a braking function of the first brake $B_1$ in the conventional type automatic transmission shown in FIG. 3, is performed under the operating condition shown in FIGS. 20 and 21 in this second embodiment of the present invention.

The operation of instantaneously releasing the locking of the counterclockwise rotation of the rear planetary carrier $K_2$ required for the smooth shifting from the second gear speed to the third gear speed in the D range, which is performed by the one-way function of the one-way clutch $F_1$ in the conventional type automatic transmission shown in FIG. 3, is performed by automatically releasing the cam function by giving a clockwise rotation to the front and rear sun gear $S_{12}$ without supplying oil under pressure.

Thus, according to the second embodiment of the present invention one device performs plural functions which are performed by the first brake $B_1$, the second brake $B_2$ and the first one-way clutch $F_1$ in the conventional type automatic transmission shown in FIG. 3, so that it is possible to remove the first brake $B_1$ and the first one-way clutch $F_1$ and accordingly decrease the axial length and the weight of the automatic transmission.

In addition to the above, smooth engaging is attainable because the engaging force is controlled by the force of $F_{PISTON}$ which is generated by the oil pressure.

Figure 22:
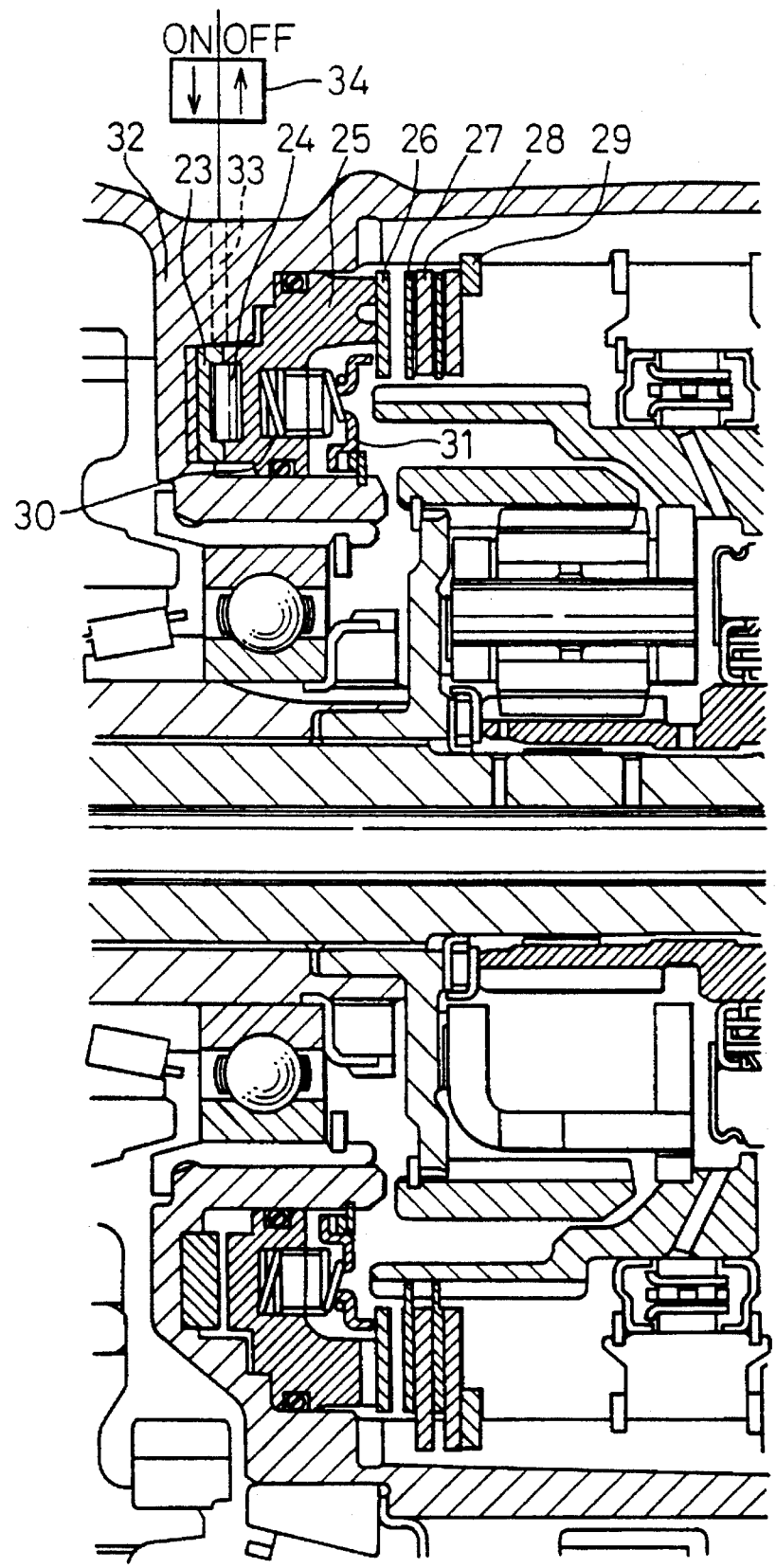
FIG. 22 is a partial sectional view of the third embodiment applied, in place of the third brake $B_3$ and the second one-way clutch $F_2$, in the conventional type transmission shown in FIG. 3.

FIG. 22 shows the third embodiment of the present invention which is applied in place of the third brake $B_3$ and the second one-way clutch $F_2$ of the conventional type automatic transmission shown in FIG. 3.

By the construction and operations described below, it is possible to remove the second one-way clutch $F_2$.

In FIG. 22, a first cam member 23, a cam roller 24 and a piston with second cam member 25 form a cam mechanism. A pressure plate 26 is attached to the right end portion of the piston with second cam member 25. Clutch discs 27 and separator plates 28 are selectively engaged by the piston with second cam member 25 through the pressure plate. A snap ring 29 limits a movement of the clutch discs 27 and the separator plates 28 to the right. A spring 30 which is supported by a spring stopper 31 always pushes the first cam member 23 and the piston with second cam member 25, including the cam roller 24, to the left.

A clutch casing 32 has a recess in which the first cam member 23 and the piston with second cam member 25, with the cam roller 24, move, and an oil passage 33 to supply oil under pressure between the first cam member 23 and the piston with second cam member 25. An oil pressure controls valve 34 controls the supply of oil under pressure.

Figure 24:
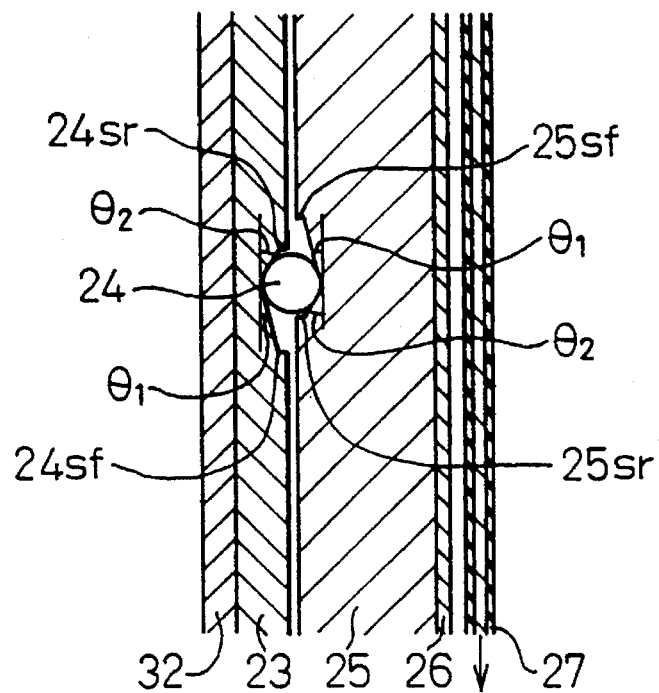
FIG. 24 is a partial sectional view taken along the line I—I of FIG. 23.

Cam faces $23c_1$ and $23c_2$ and cam faces $25c_1$ and $25c_2$ are respectively formed on the opposing surfaces of the first cam member and the piston with second cam member 25, as shown in FIG. 24.

Cam angle $\theta_1$ of the cam face $23c_1$ and $25c_1$ is defined so as to satisfy $\tan\theta_1 < \mu$, and cam angle $\theta_2$ of the cam face $23c_2$ and $25c_2$ is defined so as to satisfy $\tan\theta_2 > \mu$, where $\mu$ means the coefficient of friction between the engaging surfaces of the pressure plate 26 and the clutch disc 27.

Roller stoppers $23sf$ and $25sf$, shown in FIG. 24, cooperatingly prevent the cam roller 24 from coming off the cam located portion of the first cam member 23 and the piston with second cam member 25 when the clutch disc 27 rotates counterclockwise.

Roller stoppers $23sr$ and $25sr$, shown in FIG. 24, cooperatingly prevent the cam roller 24 from coming off the cam located portion of the first cam member 23 and the piston with second cam member 25 when the clutch disc 27 rotates clockwise.

Figure 23:
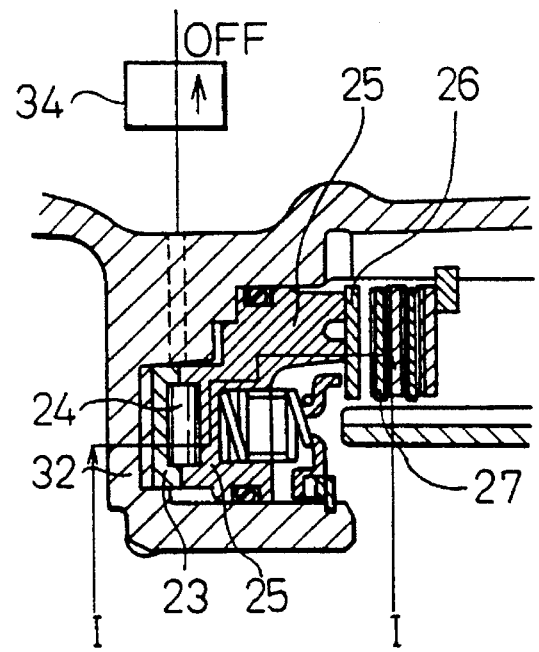
FIG. 23 is a partial sectional view of the third embodiment, in a disengaged condition with no oil pressure supplied to the piston.

FIGS. 23 and 24 show a condition with no oil under pressure supplied and the first cam member 23 and the piston with second cam member 25, with cam roller 24, are forced to the left end position by spring 30, so that the pressure plate 26 and the clutch disc 27 are disengaged. Therefore, the rear planetary carrier $K_2$ which is connected to the clutch discs 27 is not locked regardless the direction of the rotation.

Figure 25:
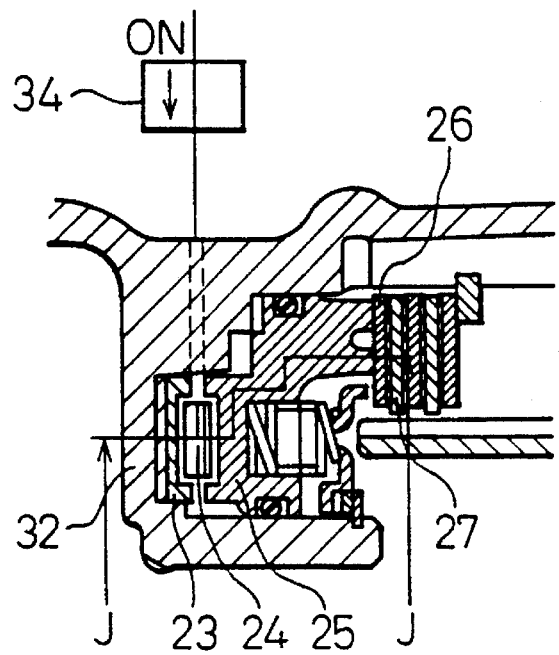
FIG. 25 is a partial sectional view of the third embodiment, in a condition with the cam members being separated and generating no reaction force.
Figure 26:
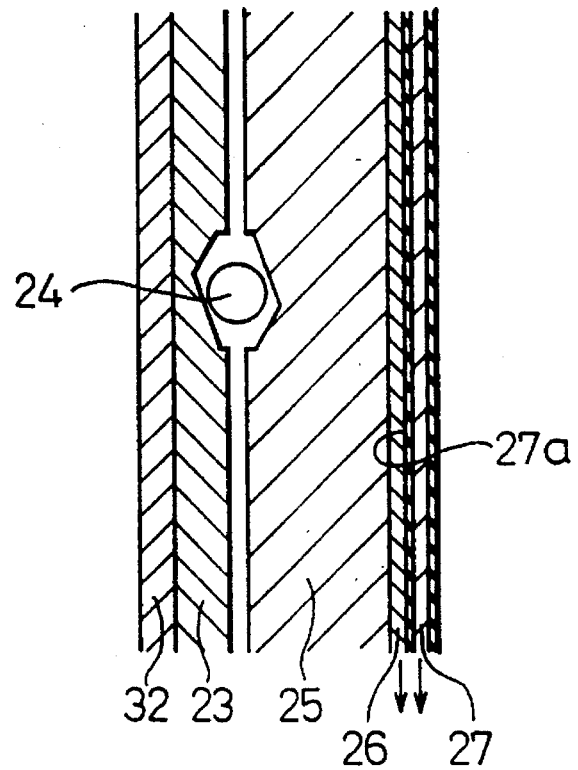
FIG. 26 is a partial sectional view taken along the line J—J of FIG. 25.

FIGS. 25 and 26 show the condition when oil under pressure is supplied to the clearance between the first cam member 23 and the piston with second cam member 25 during the counterclockwise rotation of the clutch discs 27.

When oil under pressure is supplied to the clearance between the first cam member 23 and the piston with second cam member 25, the piston with second cam member 25 is pushed to the right, so that, in due course, the pressure plate 26 and the friction surface of the clutch disc 27 begin to engage with each other, as shown in FIGS. 25 and 26. Then, the piston with second cam member 25 is dragged by the clutch disc 27, and begins to rotate in the same direction as the clutch disc 27.

Figure 27:
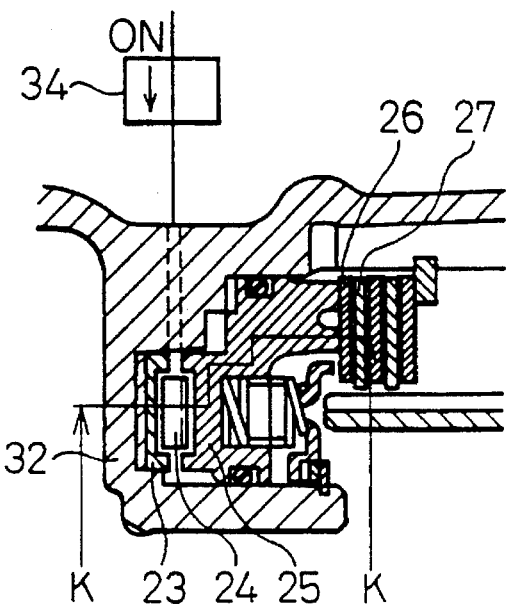
FIG. 27 is a partial sectional view of the third embodiment, in an engaged condition with cam members being separated and reacting.
Figure 28:
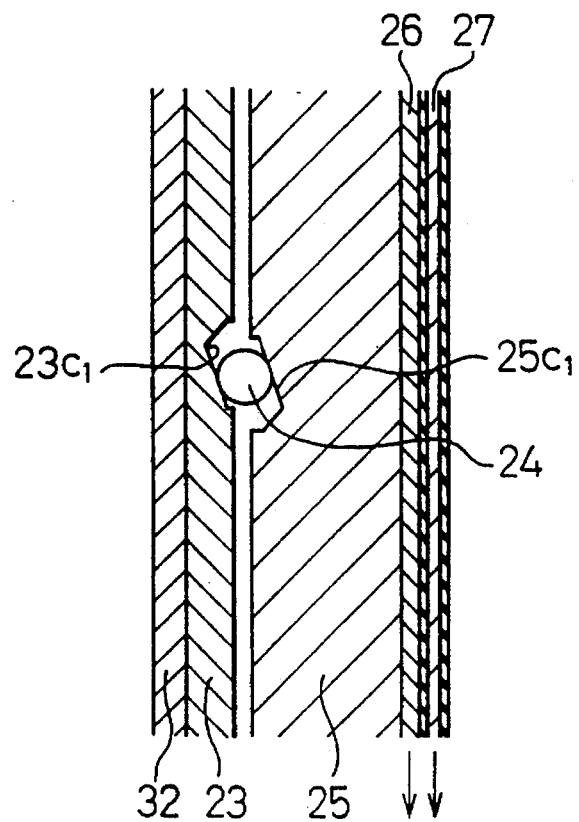
FIG. 28 is a partial sectional view taken along the line K—K of FIG. 27.

In due course, as shown in FIGS. 27 and 28, the cam face $25c_1$ of the piston with second cam member 25 begins to climb the cam face $23c_1$ of the first cam member 23 through the cam roller 24, so that a cam reaction force $F_{CAM}$, which tends to increase the distance between the first cam member 23 and the piston with second cam member 25, is generated.

As the back surface of the first cam member 23 contacts the wall of the recess of the clutch casing 32, the cam reaction force generated by the further rotation of the piston with second cam member 25 only acts to push the piston with second cam member 25 to the right, so that the engagement force between the clutch discs 27 and the separator plates 28 becomes stronger. As a result, the clutch discs 27 and the separator plates 28 are completely engaged.

If the oil pressure valve 34 is switched off after completion of the engagement, the clutch discs 27 and the separator plates 28 can be disengaged when the clutch disc 27 reverses its direction of the rotation from counterclockwise to clockwise, as described below.

When the clutch disc 27 rotates clockwise, the piston with second cam member 25 also begins to rotate clockwise by being dragged by the clutch disc 27. In due course, the cam face $25c_1$ descends the cam face $23c_1$ through the cam roller 24 and then the piston with second cam member 25 is pushed to the left by the biasing force of the spring 30. Therefore, the cam reaction force generated by cam mechanism disappears and the clutch discs 27 and the separator plates 28 are disengaged.

Figure 29:
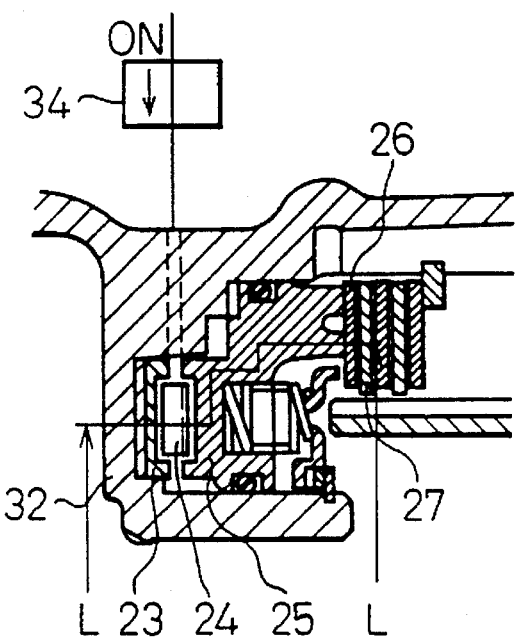
FIG. 29 is a partial sectional view of the third embodiment, in an engaged condition with a reversed torque input.
Figure 30:
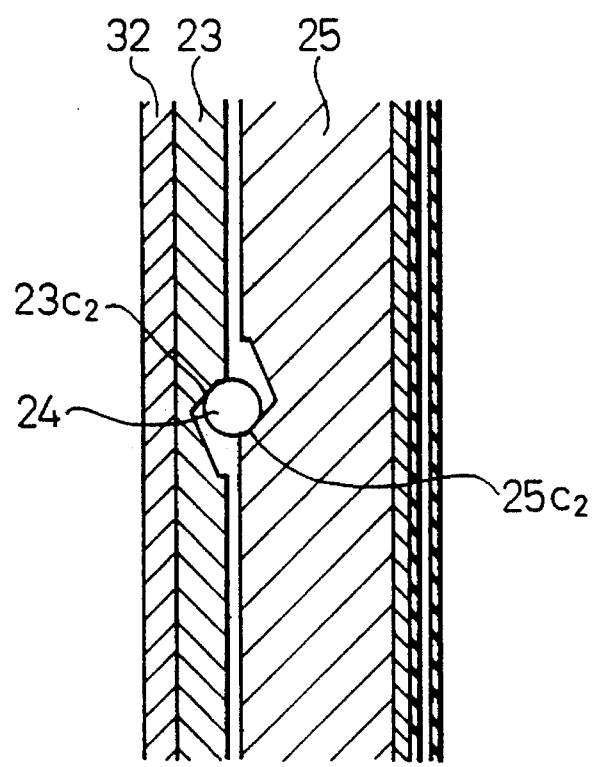
FIG. 30 is a partial sectional view taken along the line L—L of FIG. 29.

FIGS. 29 and 30 show the condition when the clutch disc 27 reverses its direction of the rotation from counterclockwise to clockwise while the oil pressure supply is maintained.

When the clutch disc 27 rotates clockwise, same as described above, the piston with second cam member 25 also begins to rotate clockwise by being dragged by the clutch disc 27. In due course, the cam face $25c_1$ descends the cam face $23c_1$ through the cam roller 24 and stops when the cam roller 24 reaches the roller stopper $23sr$ of the first cam member 23 and the roller stopper $25sr$ of the piston with second cam roller 25, as shown in FIG. 30.

By maintaining the oil pressure supply, the piston with second cam member 25 is pushed to the right, so that the clutch discs 27 and the separator plates are kept in the engaged condition. Therefore, the clockwise rotation of the rear planetary carrier $K_2$ is locked.

The third embodiment of the present invention operates as described above, therefore the clutch discs 27, and accordingly the rear planetary carrier $K_2$ to which the clutch discs 27 is connected, are changed to the required operating condition.

The operation locking the counterclockwise rotation of the rear planetary carrier $K_2$, which is performed by a locking function of the one-way clutch $F_2$, in the conventional type automatic transmission shown in FIG. 3, is performed in the condition shown in FIGS. 27 and 28 in this third embodiment.

The operation for freeing the clockwise and counterclockwise rotation of the rear planetary carrier $K_2$, which is performed by a free running function of the one-way clutch $F_2$ in the conventional type automatic transmission shown in FIG. 3, is performed in the condition shown in FIGS. 23 and 24 in this third embodiment.

The operation for locking the clockwise rotation of the rear planetary carrier $K_2$, which is performed by a braking function of the third brake $B_3$, in the conventional type automatic transmission shown in FIG. 3, is performed in the condition shown in FIGS. 29 and 30 in this third embodiment.

The operation for instantaneously releasing the lock on the counterclockwise rotation of the rear planetary carrier $K_2$, required for the smooth shifting from the first gear speed to the second gear speed in the D range, which is performed by the one-way function of the one-way clutch $F_2$ in the conventional type automatic transmission shown in FIG. 3, is performed by automatically releasing the cam function by giving a clockwise rotation to the rear planetary carrier $K_2$ without supplying oil pressure.

Thus, according to the third embodiment of the present invention one device performs two kinds of functions which are performed by the third brake $B_3$ and the second one-way clutch $F_2$ in the conventional type automatic transmission shown in FIG. 3, and this allows the one-way clutch to be removed and the axial length and the weight of the transmission to be decreased.

Figure 31:
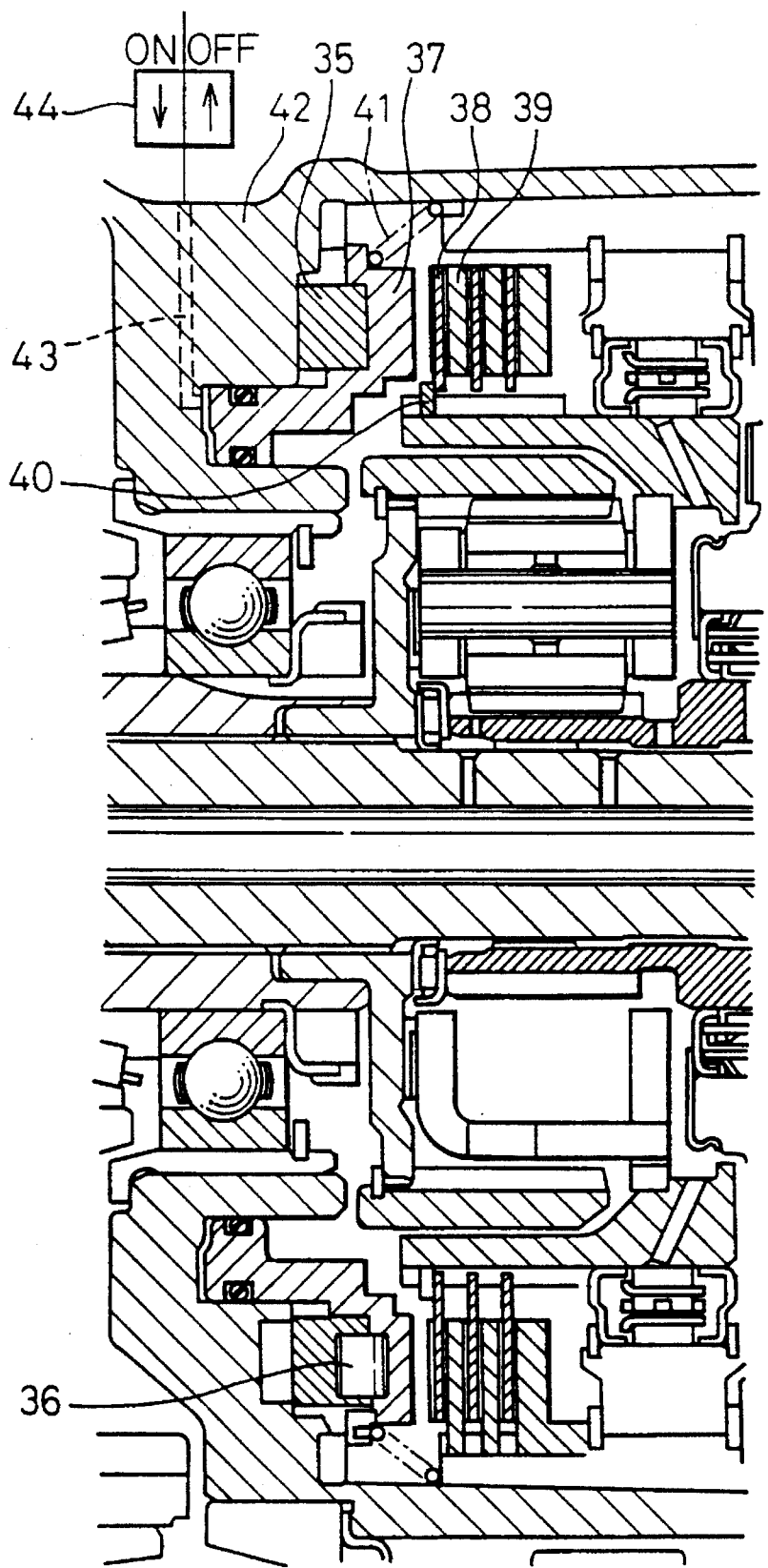
FIG. 31 is a partial sectional view of the fourth embodiment applied to the first clutch $B_3$ and the second one-way clutch $F_2$ of the conventional type transmission shown in FIG. 3.

FIG. 31 shows the fourth embodiment of the present invention which is applied in place of the third brake $B_3$ and the second one-way clutch $F_2$ of the conventional type automatic transmission shown in FIG. 3.

Using the construction and operations described below, the second one-way clutch $F_2$ can be omitted.

In FIG. 31, a first cam member 35, a cam roller 36 and a piston with second cam member 37 form a cam mechanism. A pressure plate 26 is attached to the right end portion of the piston with second cam member 37. Clutch discs 38 and separator plates 39 are selectively engaged. A snap ring 40 limits the movement of the clutch discs 38 and separator plates 39 to the left. A spring 41 always pushes the first cam member 35 and the piston with second cam member 37, including the cam roller 36, to the left.

A clutch casing 42 has a recess (no reference numeral) in which the first cam member 35 and the piston with second cam member 37, including the cam roller 3, move, and an oil passage 43 to supply oil under pressure to the back surface of the piston with second cam member 37. An oil pressure control valve 44 controls the supply of oil under pressure.

Figure 33:
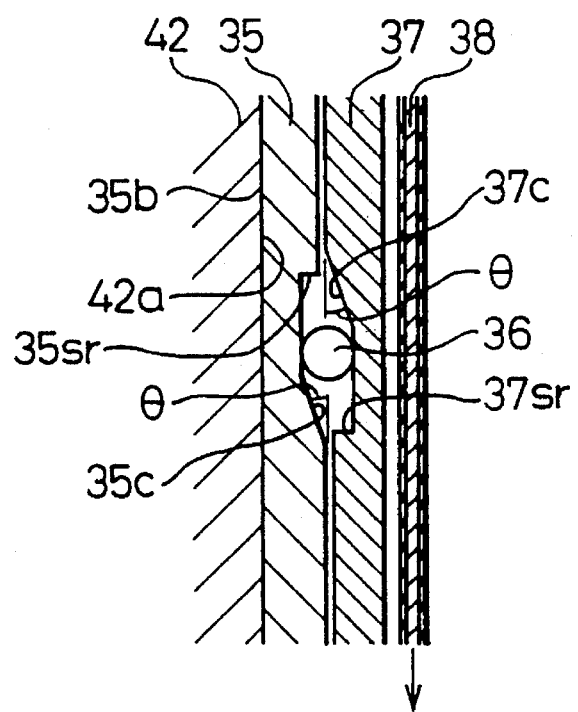
FIG. 33 is a partial sectional view taken along the line M—M of FIG. 32.

A cam faces 35c and 37c are respectively formed on the opposing surfaces of the first cam member 35 and the piston with second member 37, as shown in FIG. 33.

The cam angle θ of the cam face 35c and 37c are defined so as to satisfy tan θ<μ, where μ means the coefficient of friction between the piston with second cam member 37 and the clutch disc 38.

Roller stoppers 35sr and 37sr, shown in FIG. 33, cooperatively prevent the cam roller 36 from coming off the cam located part of the first cam member 35 and the piston with second cam member 37 when the clutch disc 38 rotates clockwise.

Figure 32:
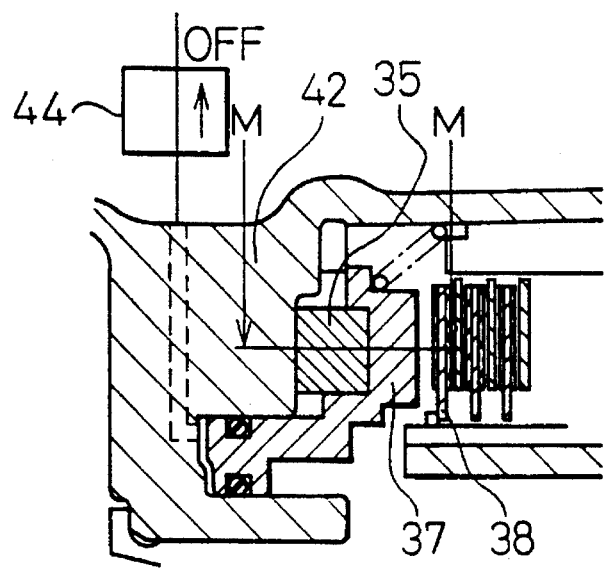
FIG. 32 is a partial sectional view of the fourth embodiment, in a disengaged condition with no oil pressure supplied to the piston.

FIGS. 32 and 33 show a condition with no supply of oil under pressure and the first cam member 35 and the piston with second cam member 37, including cam roller 36, are forced to the left end position by spring 41, so that the first cam member 35 and the piston with second cam member 37 are separated. Therefore, the rear planetary carrier $K_2$, which is connected to the clutch discs 38 is not locked regardless the direction of its rotation.

Figure 34:
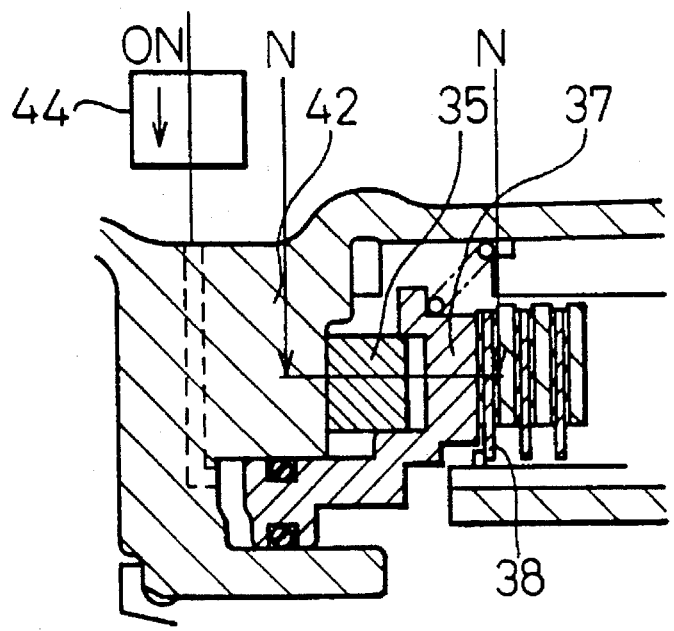
FIG. 34 is a partial sectional view of the fourth embodiment, in a condition with the cam members being separated and generating no reaction force.
Figure 35:
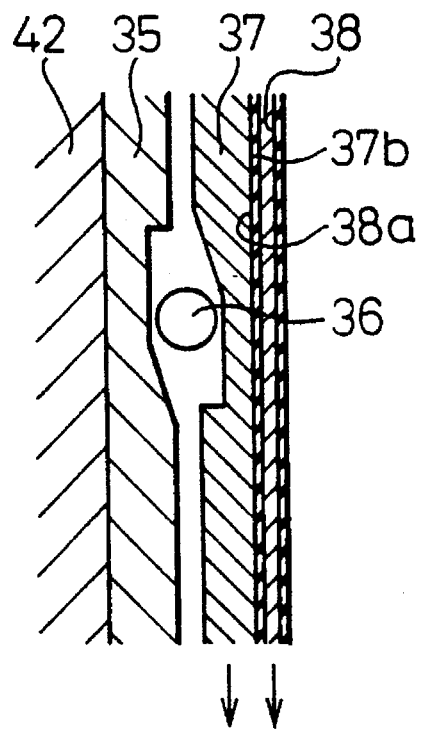
FIG. 35 is a partial sectional view taken along the line N—N of FIG. 16.

FIGS. 34 and 35 show a condition, when oil pressure is supplied to the back surface of the piston with the second cam member 37 during the counterclockwise rotation of the clutch discs 38.

When oil under pressure is supplied to the back surface of the piston with the second cam member 37, the piston with the second cam member 37 is pushed to the right, so that, in due course, the piston with the second cam member 37 and the friction surface of the clutch disc 38 begin to engage with each other, as shown in FIGS. 34 and 35. Then, the piston with second cam member 37 is dragged by the clutch disc 38, and begins to rotate in the same direction as the clutch disc 38.

Figure 36:
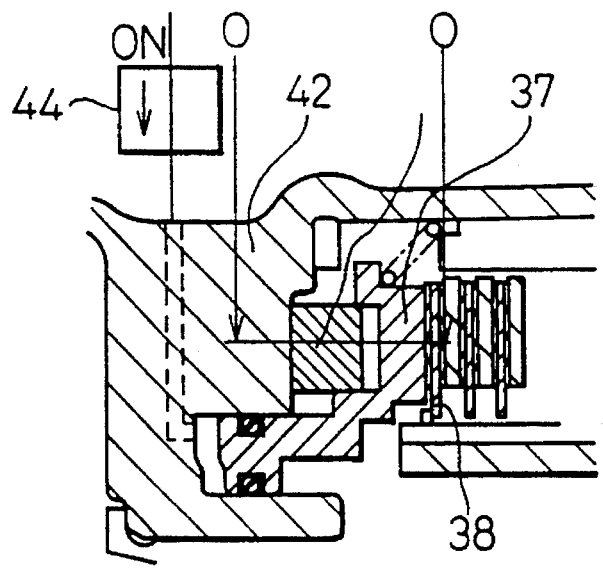
FIG. 36 is a partial sectional view of the fourth embodiment, in an engaged condition with cam members being separated and generating reaction force.
Figure 37:
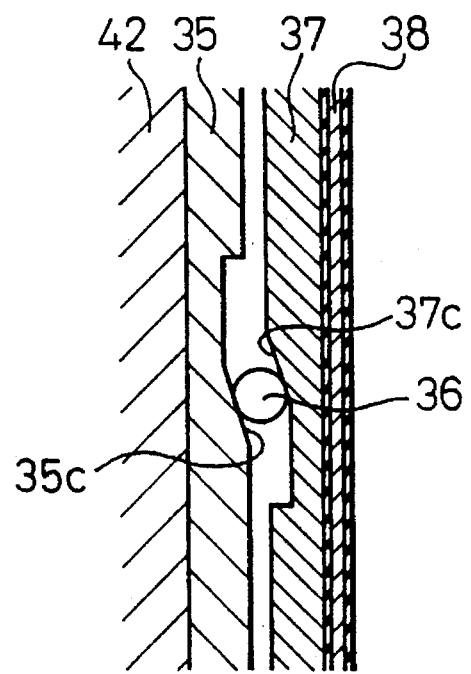
FIG. 37 is a partial sectional view taken along the line O—O of FIG. 18.

In due course, as shown in FIGS. 36 and 37, the cam face 37c of the piston with second cam member 37 begins to climb the cam face 35c of the first cam member 35 through the cam roller 36, so that a cam reaction force $F_{CAM}$, which tends to increase the distance between the first cam member 35 and the piston with the second cam member 37, is generated.

As the back surface of the first cam member 35 contacts the wall of casing 42, the cam reaction force generated by the further rotation of the piston with second cam member 37 only acts to push the piston with second cam member 37 to the right, so that the engagement force between the clutch discs 38 and the separator plates 39 becomes stronger. As a result, the clutch discs 38 and the separator plates 39 are completely engaged.

If, the oil pressure valve 44 is switched off after the completion of the engagement, the clutch discs 38 and the separator plates 39 can be disengaged when the clutch disc 38 changes its direction of the rotation from counterclockwise to clockwise, as described below.

When the clutch disc 38 rotates clockwise, the piston with second cam member 37 also begins to rotate clockwise by being dragged by the clutch disc 38. In due course, the cam face 37c descends the cam face 35c through the cam roller 36 and then the piston with second cam member 37 is pushed to the left by the biasing force of the spring 41 and the cam reaction force generated by cam mechanism disappears, so that the clutch discs 38 and the separator plates are disengaged.

Figure 38:
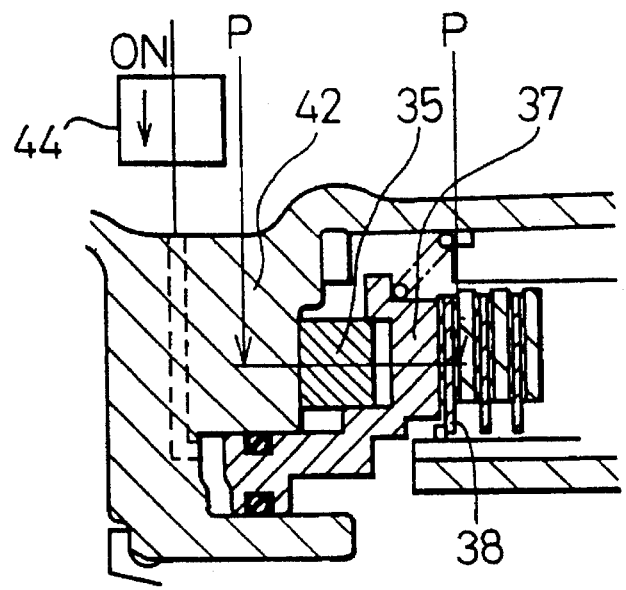
FIG. 38 is a partial sectional view of the fourth embodiment applied to the third brake $B_3$ in FIG. 1, in an engaged condition with a reversed torque input.
Figure 39:
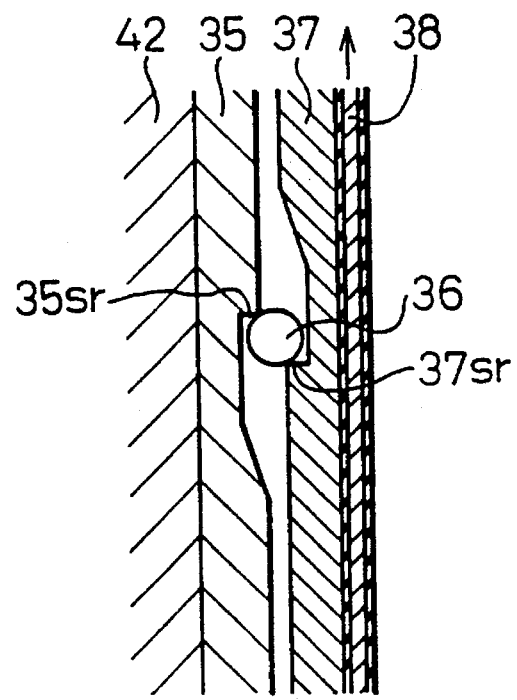
FIG. 39 is a partial sectional view taken along the line P—P of FIG. 38.

FIGS. 38 and 39 show the condition when the clutch disc 38 changes its direction of the rotation from counterclockwise to clockwise while the oil under pressure is supplied.

When the clutch disc 38 rotates clockwise, as described above, the piston with second cam member 37 also begins to rotate clockwise by being dragged by the clutch disc 38. In due course, the cam face 37c descends the cam face 35c through the cam roller 36 and stops when the cam roller 36 reaches the roller stopper 35sr of the first cam member 35 and the roller stopper 37sr of the piston with second cam member 37, as shown in FIG. 39.

By maintaining the supply of oil under pressure, the piston with second cam member 37 is pushed to the right, so that the clutch discs 38 and the separator plates are kept in engaged condition. Therefore, the clockwise rotation of the rear planetary carrier K₂ is locked.

The fourth embodiment of the present invention operates as described above and, therefore, the clutch discs 38, and accordingly the rear planetary carrier K₂ to which the clutch discs 38 are connected, are changed to the required operating condition.

The operation of locking the counterclockwise rotation of the rear planetary carrier K₂, which is performed by a locking function of the one-way clutch F₂ in the conventional type automatic transmission shown in FIG. 3, is performed in the condition shown in FIGS. 36 and 37 in this fourth embodiment.

The operation for freeing the clockwise rotation of the rear planetary carrier K₂, which is performed by a free running function of the one-way clutch F₂ in the conventional type automatic transmission shown in FIG. 3, is performed in the condition shown in FIGS. 32 and 33 in this fourth embodiment.

The operation of locking the clockwise rotation of the rear planetary carrier K₂, which is performed by a braking function of the third brake B₃ in the conventional type automatic transmission shown in FIG. 3, is performed in the condition shown in FIGS. 38 and 39 in this fourth embodiment.

The operation for instantaneously releasing the lock on the counterclockwise rotation of the rear planetary carrier K₂, required for the smooth shifting from the first gear speed to the second gear speed in the D range, which is performed by the one-way function of the one-way clutch F₂ in the conventional type automatic transmission shown in FIG. 3, is performed by automatically releasing the cam functioning by giving a clockwise rotation to the rear planetary carrier K₂ without supplying oil under pressure.

Thus, according to the fourth embodiment of the present invention one device performs two kinds of functions which are performed by the third brake B₃ and the second one-way clutch F₂ in the conventional type automatic transmission shown in FIG. 3, and this allows the one-way clutch to be removed and, accordingly, the axial length and the weight of the transmission to be decreased.

We claim:

1. A clutch device comprising;

a pair of members spaced on a common axis and relatively rotating around said common axis;

a variable length coupling means disposed on said common axis between said relatively rotating members having a pair of cam members; and a piston means selectively pushing said variable length coupling means toward one of said relatively rotating members, said piston means causing frictional engagement between one end of said variable length coupling means and one of said relatively rotating members so that said cam members relatively rotate and cooperatingly generate a cam force in an axial direction which elongates said variable length coupling means and couples said relatively rotating members;

wherein said piston means pushes said variable length coupling means even when the direction of said relative rotation of said relatively rotating members is reversed; and wherein said cam members have stoppers to limit an axial overall length of said variable length coupling means when said variable length coupling means are fully elongated by said cam force generated by said cam members so as to maintain a clearance between said piston means and said variable length coupling means on that occasion and to receive said cam force caused by oil under pressure supplied to said piston means.

2. A clutch device according to claim 1, wherein said variable length coupling means pushes said piston means toward one of said relatively rotating members which does not frictionally engage with said variable length coupling means, and said one of said relatively rotating members which does not frictionally engage with said variable length coupling means receive said cam force generated by said cam members after said piston means contacts with said one of said relatively rotating members which does not frictionally engage with said variable length coupling means.

3. A clutch device according to claim 1, wherein each of said cam members have two cam faces which can generate a cam force regardless of the direction of said relative rotation of said relatively rotating members.

4. A clutch device according to claim 3, wherein said two cam faces have the same cam angles.

5. A clutch device according to claim 3, wherein said two cam faces have different cam angles.

6. A clutch device according to claim 1, wherein said piston means is incorporated into one of said cam members.

7. A clutch device according to claim 1, wherein said cam members are located outside of said piston means.

8. A clutch device according to claim 1, wherein said cam members have stoppers which prevent said cam members from contacting with each other outside the cam face located portion.

9. A clutch device for engaging a pair of relatively rotating members spaced on a common axis having a first frictional engaging element fitted unrotatably and axially movably to one of said relatively rotating members, and a second frictional engaging element fitted unrotatably and axially movably to the other of said relatively rotating members, said clutch device comprising:

a variable length coupling means disposed on said common axis between said relatively rotating members and including an axially movable first cam member and an axially movable second cam member and a cam roller disposed therebetween;

a piston means having a piston member and an oil pressure chamber in which oil pressure is supplied for selectively pushing said first cam member and said second cam member therewith to cause a frictional engagement between said second cam member and said second frictional engaging element; and an oil pressure control means for controlling oil pressure supplied to said oil pressure chamber;

wherein:

said first cam member is arranged to be rotated with said one of said pair of relatively rotating members;

said second cam member is arranged to be rotationally dragged by said other of said pair of rotating members with said frictional engagement between said second cam member and said second frictional engaging element caused by said piston means;

said first cam member and said second cam member respectively have opposing parallel slanted cam surfaces, of which a cam angle θ is chosen to satisfy tan θ<μ, where μ is a coefficient of friction between said second cam member and said second frictional engaging element, so that said cam roller is positioned between said slanted cam surfaces so as to increase a distance between said first cam member and said second cam member, and thereby generates a cam force of which the reaction force is received by said one of said pair of relatively rotating members, when said pair of members are relatively rotating in one direction and said second cam member is rotationally dragged;

said oil pressure control means supplies oil pressure to said oil pressure chamber of said piston means and relieves said oil pressure therefrom after said second cam member is rotationally dragged to engage said first frictional engaging element and said second frictional engaging element when said pair of members are relatively rotating in one direction and to disengage said first frictional engaging element and said second frictional engaging element when said pair of members are relatively rotating in a direction reverse to said one direction; and said oil pressure control means supplies oil pressure to said oil pressure chamber of said piston means to engage said first frictional engaging element and said second frictional engaging element when said pair of members are relatively rotating in a direction reverse to said one direction.

10. A clutch device according to claim 9, wherein:

said first cam member and said second cam member respectively have bi-directional V-shaped cam surfaces, two parallel slanted opposing cam surfaces of said V-shaped cam surfaces having a cam angle $\theta$ which is chosen to satisfy $\tan \theta < \mu$; and the other two parallel slanted opposing cam surfaces of said V-shaped cam surfaces have a cam angle $\theta$ which is chosen to satisfy $\tan \theta > \mu$, where $\mu$ is a coefficient of friction between said second cam member and said second frictional engaging element.

11. A clutch device according to claim 9, wherein each of said opposing cam surfaces respectively has a stopper for limiting a movement of said cam roller.

12. A clutch device according to claim 9, wherein an axial movement of said first cam member is blocked through the piston member of said piston means when said piston member itself abuts against said one of said relatively rotating members.

13. A clutch device for engaging a pair of relatively rotating members spaced on a common axis, having a first frictional engaging element fitted unrotatably and axially movably to one of said relatively rotating members, and a second frictional engaging element fitted unrotatably and axially movably to the other of said relatively rotating members, said clutch device comprising:

a variable length coupling means disposed on said common axis between said relatively rotating members and composed of an axially movable first cam member and an axially movable second cam member and a cam roller disposed therebetween;

a piston means having a piston member and an oil pressure chamber in which oil pressure is supplied for selectively pushing said first cam member and said second cam member therewith to cause a frictional engagement between said second cam member and said second frictional engaging element; and an oil pressure control means for controlling oil pressure supplied to said oil pressure chamber;

wherein:

said first cam member is arranged to be rotated with said one of said pair of relatively rotating members;

said second cam member is arranged to be rotationally dragged by said other of said pair of rotating members with said frictional engagement between said second cam member and said second frictional engaging element caused by said piston means;

said first cam member and said second cam member respectively have opposing parallel slanted cam surfaces and a stopper to limit a movement of said cam roller of which cam angle $\theta$ is chosen to satisfy $\tan \theta < \mu$, where $\mu$ is a coefficient of friction between said second cam member and said second frictional engaging element, so that said cam roller is positioned between said slanted cam surfaces so as to increase a distance between said first cam member and said second cam member until said distance is limited by a function of said stopper so as to keep a clearance between said piston member of said piston means and said one of said relatively rotating members, and thereby generates a cam force of which a reaction force is received by said oil pressure supplied to said oil pressure chamber when said pair of members are relatively rotating in one direction and said second cam member is rotationally dragged;

said oil pressure control means supplies oil pressure to said oil pressure chamber of said piston means and relieves oil pressure therefrom after said pair of members relatively rotate in a direction reverse to said one direction to engage said first frictional engaging element and said second frictional engaging element when said pair of members relatively rotate in said one direction and disengage said first frictional engaging element and said second frictional engaging element when said pair of members relatively rotate in a direction reverse to said one direction; and said oil pressure control means supplies oil pressure to said oil pressure chamber of said piston means to engage said first frictional engaging element and said second frictional engaging element when said pair of members relatively rotate in a direction reverse to said one direction.

14. A clutch device according to claim 13, wherein said first cam member and said piston member of said piston means are integrally formed.

15. A clutch device for engaging a pair of relatively rotating members spaced on a common axis, having a first frictional engaging element fitted unrotatably and axially movably to one of said relatively rotating members, and a second frictional engaging element fitted unrotatably and axially movably to the other of said relatively rotating members, said clutch device comprising;

a variable length coupling means disposed on said common axis between said relatively rotating members and including a first cam member formed integrally with one of said pair of relatively rotating members and an axially movable second cam member and a cam roller disposed therebetween;

a piston means having a piston member and an oil pressure chamber in which oil pressure is supplied for selectively pushing said second cam member therewith to cause a frictional engagement between said second cam member and said second frictional engaging element; and an oil pressure control means for controlling oil pressure supplied to said oil pressure chamber;

wherein:

said second cam member is arranged to be rotationally dragged by said other of said pair of rotating members with said frictional engagement between said second cam member and said second frictional engaging element caused by said piston means;

said first cam member and said second cam member respectively have opposing parallel slanted cam surfaces of which a cam angle θ is chosen to satisfy tan θ<μ, where μ is a coefficient of friction between said second cam member and said second frictional engaging element, so that said cam roller is positioned between said slanted cam surfaces so as to increase a distance between said first cam member and said second cam member, and thereby generating a cam force of which reaction force is received by said one of said pair of relatively rotating members when said pair of members relatively rotate in one direction and said second cam member is rotationally dragged;

said oil pressure control means supplies oil pressure to said oil pressure chamber of said piston means and relieves oil pressure therefrom after said second cam member is rotationally dragged to engage said first frictional engaging element and said second frictional engaging element when said pair of members relatively rotate in said one direction and disengage said first frictional engaging element and said second frictional engaging element when said pair of members relatively rotate in a direction reverse to said one direction;

said oil pressure control means supplies oil pressure to said oil pressure chamber of said piston means to engage said first frictional engaging element and said second frictional engaging element when said pair of members relatively rotate in a direction reverse to said one direction.

16. A clutch device according to claim 15, wherein:

said first cam member and said second cam member respectively have bi-directional V-shaped cam surfaces, two parallel slanted opposing cam surfaces of said V-shaped cam surfaces having a cam angle θ which is chosen to satisfy tan θ<μ; and the other two parallel slanted opposing cam surfaces of said V-shaped cam surfaces have a cam angle θ which is chosen to satisfy tan θ>μ, where μ is a coefficient of friction between said second cam member and said second frictional engaging element.

17. A clutch device according to claim 15, wherein said second cam member and said piston member of said piston means are integrally formed.

18. A clutch device according to claim 15, wherein said first cam member is located in said oil pressure chamber of said piston means.

19. A clutch device according to claim 15, wherein said first cam member is located out of said oil pressure chamber of said piston means.

20. A clutch device according to claim 15, wherein each of said opposing cam surfaces respectively has a stopper for limiting a movement of said cam roller.

* * * * *